(12) United States Patent
Ping et al.

(10) Patent No.: US 12,265,443 B2
(45) Date of Patent: Apr. 1, 2025

(54) BLOCK-STORAGE SERVICE SUPPORTING MULTI-ATTACH AND HEALTH CHECK FAILOVER MECHANISM

(71) Applicant: Amazon Technologies, Inc., Seattle, WA (US)

(72) Inventors: Fan Ping, Kenmore, WA (US); Andrew Boyer, Seattle, WA (US); Oleksandr Chychykalo, Mercer Island, WA (US); James Pinkerton, Sammamish, WA (US); Danny Wei, Seattle, WA (US); Norbert Paul Kusters, Seattle, WA (US); Divya Ashok Kumar Jain, Issaquah, WA (US); Jianhua Fan, Issaquah, WA (US); Thomas Tarak Mathew Veppumthara, Seattle, WA (US); Sebastiano Peluso, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 158 days.

(21) Appl. No.: 17/937,389

(22) Filed: Sep. 30, 2022

(65) Prior Publication Data
US 2023/0022729 A1    Jan. 26, 2023

Related U.S. Application Data

(63) Continuation of application No. 17/239,440, filed on Apr. 23, 2021, now Pat. No. 11,461,156, which is a
(Continued)

(51) Int. Cl.
*G06F 11/07* (2006.01)
*G06F 3/06* (2006.01)
(Continued)

(52) U.S. Cl.
CPC ........ *G06F 11/0751* (2013.01); *G06F 3/0619* (2013.01); *G06F 3/065* (2013.01);
(Continued)

(58) Field of Classification Search
None
See application file for complete search history.

(56) References Cited

U.S. PATENT DOCUMENTS 8,924,966 B1    12/2014    Moore et al.
10,599,354 B1 *   3/2020    Greenwood .......... G06F 3/0613
(Continued)

OTHER PUBLICATIONS

U.S. Appl. No. 18/478,624, filed Sep. 29, 2023, Amit Shah.

*Primary Examiner* — Brian R Peugh
(74) *Attorney, Agent, or Firm* — Alexander A. Knapp; Kowert, Hood, Munyon, Rankin & Goetzel, P.C.

(57) ABSTRACT

A block-based storage system hosts logical volumes that are implemented via multiple replicas of volume data stored on multiple resource hosts in different failure domains. Also, the block-based storage service allows multiple client computing devices to attach to a same given logical volume at the same time. In order to prevent unnecessary failovers, a primary node storing a primary replica is configured with a health check application programmatic interface (API) and a secondary node storing a secondary replica determines whether or not to initiate a failover based on the health of the primary replica.

22 Claims, 22 Drawing Sheets

Related U.S. Application Data continuation of application No. 16/560,859, filed on Sep. 4, 2019, now Pat. No. 10,990,464.

(51) Int. Cl.
  *G06F 9/455* (2018.01)
  *G06F 11/20* (2006.01)
  *G06F 11/14* (2006.01)

(52) U.S. Cl.
  CPC ............ *G06F 3/0665* (2013.01); *G06F 3/067* (2013.01); *G06F 9/45558* (2013.01); *G06F 11/0709* (2013.01); *G06F 11/0712* (2013.01); *G06F 11/0793* (2013.01); *G06F 11/2023* (2013.01); *G06F 2009/45583* (2013.01); *G06F 11/1456* (2013.01); *G06F 2201/82* (2013.01)

(56) References Cited

U.S. PATENT DOCUMENTS

| | | |
|---|---|---|
| 10,613,789 B1 | 4/2020 | Moore et al. |
| 10,929,041 B1 | 2/2021 | Ping et al. |
| 10,990,464 B1 | 4/2021 | Ping et al. |
| 11,461,156 B2 | 10/2022 | Ping et al. |
| 2004/0148443 A1 | 7/2004 | Achiwa |
| 2012/0011394 A1 | 1/2012 | Maki et al. |
| 2016/0253400 A1 | 9/2016 | McAlister et al. |
| 2016/0359981 A1* | 12/2016 | Ulatoski .................. H04L 63/08 |
| 2017/0031699 A1 | 2/2017 | Banerjee et al. |
| 2019/0124018 A1 | 4/2019 | Zhang |

* cited by examiner

BLOCK-STORAGE SERVICE SUPPORTING MULTI-ATTACH AND HEALTH CHECK FAILOVER MECHANISM

This application is a continuation of U.S. patent application Ser. No. 17/239,440, filed Apr. 23, 2021, which is a Continuation of U.S. patent application Ser. No. 16/560,859, filed Sep. 4, 2019, now U.S. Pat. No. 10,990,464, which are hereby incorporated by reference herein in their entirety.

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments may provide various guarantees as to the availability and durability of computing resources. Distributing computing resources amongst multiple resource hosts may provide different availability and durability characteristics. For example, virtual computing resources may provide block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability.

Current block-based storage systems may attach a single virtual volume to a single compute instance, but may not function properly when multiple computing resources with varied network connections are attached to a shared virtual volume.

Figure 1:
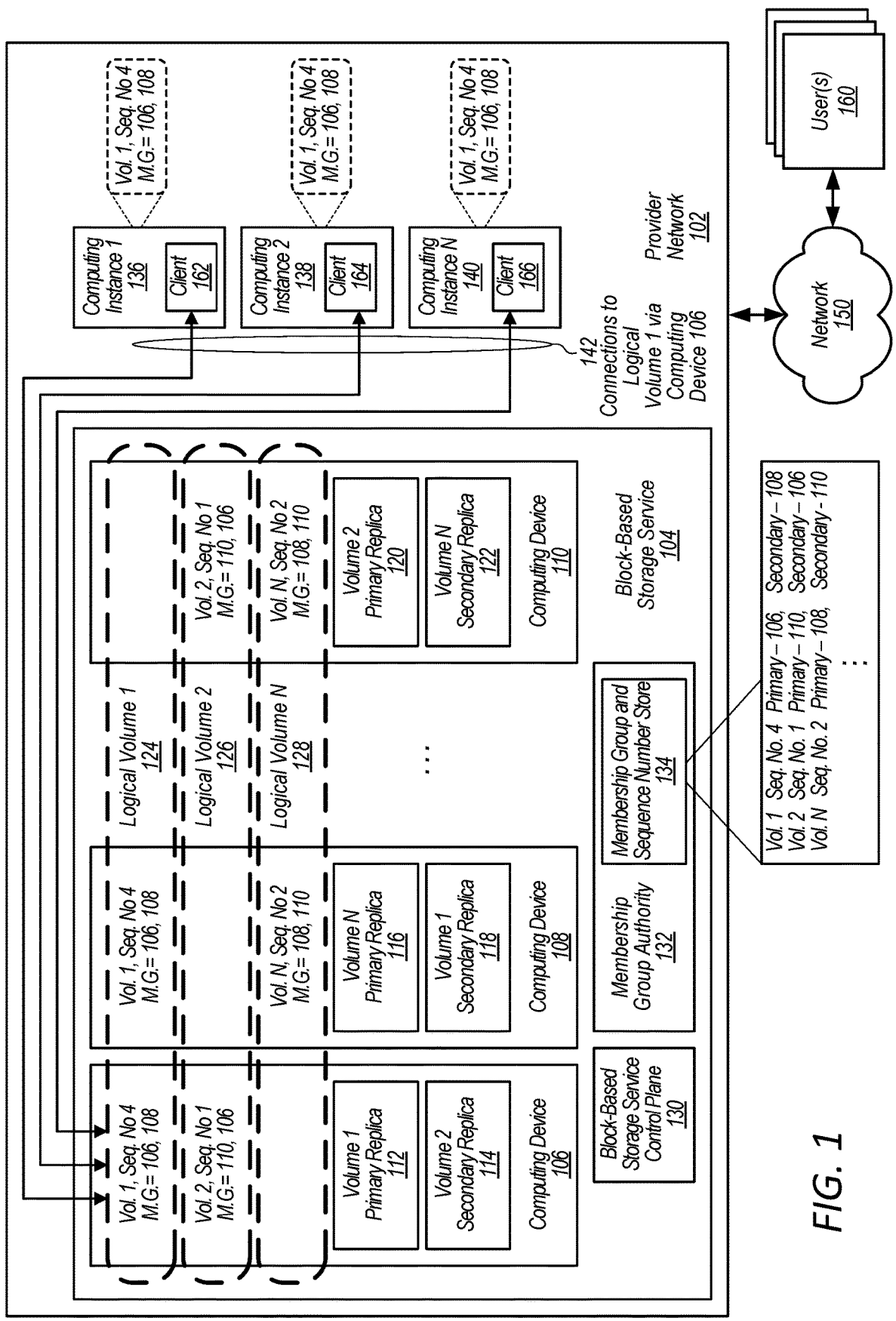
FIG. 1 is a block diagram illustrating a provider network that includes a block-based storage service that supports multi-attach volumes, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The present disclosure generally relates to allowing multiple clients (e.g. computing systems that can perform reads and writes of data) to attach to a logical volume stored in a distributed computing environment while still guaranteeing linearizability, meaning that any response to a read request received after a write request has been committed will include any changes affected by the write request. In general, a volume can correspond to a logical collection of data, such as a set of data maintained on behalf of a user. The data of the volume may be replicated between multiple devices within a distributed computing system, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary volume can be to facilitate reads and writes (sometimes referred to as "input output operations," or simply "I/O operations") at the volume for attached clients, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although many examples herein discuss a primary replica and a secondary replica, it will be appreciated that a logical volume can include multiple secondary replicas.

Allowing multiple clients to simultaneously connect to the same volume can present challenges with respect to data linearizability and system efficiency. For example, if there is inconsistency amongst the clients regarding which replica is the primary replica of the volume, then data read from one replica may not reflect writes made to the other replica. As another example, if network conditions or errors at a particular client prevent connection of the particular client to the primary replica, even though the primary replica is still healthy (e.g., able to serve I/O), the particular client may initiate a failover to the secondary replica, which would assume the role of the primary replica. Existing connections between the original primary replica and other clients may trigger failover back to the original primary. This "flip flop" of which replica assumes the role of primary can cause system inefficiencies such as latency in serving I/O and unnecessary usage of network connections between distributed computing devices including the clients, the replicas, and any control plane components involved in failover.

The above described problems are addressed in some embodiments by the disclosed techniques for managing multiple client connections to a distributed, replicated data volume (referred to herein as multi-attach techniques). Aspects of the disclosed multi-attach techniques can implement a health check mechanism, wherein a secondary replica that receives a failover request (e.g., a connection request from a client that cannot reach the primary replica) asks for a health check information from the current primary replica prior to initiating failover. This can beneficially prevent one client from initiating a failover while other clients remain connected to the primary replica. In some embodiments, various health criteria of the primary replica (and/or the computing device or node storing the primary replica) may be used to determine whether or not to proceed with initiating a failover, for example whether any clients are still connected to the primary replica, whether such clients have been performing a greater amount of I/O than the client requesting the failover, and how much of the node's network bandwidth is being consumed by other volumes stored on the node. Aspects of the disclosed multi-attach techniques can implement a peer confirmation mechanism, wherein each member of a current membership group for a logical volume (e.g. a primary node and one or more secondary nodes) locally stores a sequence number and a primary node verifies that all members are on the current sequence number before responding to an IO request. This can beneficially prevent performing I/O at a superseded primary replica (e.g., a replica that is no longer the primary replica, despite having a connection to one of the clients that was established prior to failover).

In some embodiments, a system includes a plurality of computing devices configured to implement a block-based storage system, wherein at least one of the computing devices is configured to implement a membership group authority for the block-based storage system. The computing devices of the block-based storage system store primary and secondary replicas of logical volumes or partitions of logical volumes hosted by the block-based storage system. In some embodiments, the block-based storage system may support two-way replication wherein data for a logical volume or logical volume partition is stored on two separate nodes, wherein one node stores a primary replica and another node stores a secondary replica. In some embodiments, a block-based storage system may support N-way replication, wherein one node stores a primary replica of data for a logical volume or logical volume partition and "N" additional nodes store "N" replicas of the data for the logical volume or the logical volume partition, wherein "N" is a number equal to or greater than two. In some embodiments, client computing devices, such as computing instances of a virtualized computing service, attach or connect to a virtual volume hosted by the block-based storage system such that the virtual volume that is implemented across multiple separate computing devices (e.g. storage hosts or nodes) of the block-based storage system appears to the client computing device as a locally attached storage device. For example, a logical volume may appear to a client computing device as being connected to the client computing device via an internet small computer system interface (iSCSI), in some embodiments.

In some embodiments, client computing devices may connect or attach to a logical volume via a first computing device (e.g. storage host or node) storing a primary replica of the logical volume or partition of the logical volume. In some embodiments, read requests and write requests may be serviced only by a computing device of the block-based storage system storing a primary replica and requests directed to a computing device storing a secondary replica may trigger a transition operation to be performed such that the computing device storing the secondary replica is converted into storing a primary replica. In some embodiments, the transition operation may comprise the computing device storing the secondary replica assuming a role of storing the primary replica and the computing device previously storing the primary replica assuming a role of storing the secondary replica. For example, the primary and secondary replicas may be "flipped." This may have the advantage of reducing or eliminating a need to re-mirror data to a new secondary replica as the previous primary replica will already have the data necessary to function as a secondary replica. In some embodiments, the transition operation may comprise promoting the secondary replica to primary replica, designating an additional node to store a replacement secondary replica, and re-mirroring volume data from the new primary replica to the replacement secondary replica.

Also, in some embodiments a block-based storage system may be configured to connect multiple client computing devices to a same logical volume at the same time. For example, the block-based storage system may be configured to connect a first client computing device to a logical volume of a plurality of logical volumes hosted by the block-based storage system, wherein the first client computing device connects to the logical volume via a first computing device of the block-based storage system storing a primary replica of the logical volume. The block-based storage system may also be configured to connect a second client computing device to the logical volume via the first computing device storing the primary replica of the logical volume, such that both the first client computing device and the second client computing device are connected to the logical volume at the same time via the first computing device storing the primary replica. Both the client computing devices concurrently connected to the logical volume may send write requests and read requests to write data to the logical volume or read data from the logical volume. The block-based storage system may guarantee linearizability, meaning that any response to a read request received after a write request has been committed will include any changes affected by the write request. Also any read response to a read request received prior to a write being committed will not include changes affected by the yet-to-be committed write.

Because multiple client computing devices may be connected or attached to a same logical volume implemented across multiple computing devices (e.g. nodes) of a block-based storage system at the same time, it may be necessary to ensure that both the client computing devices and computing devices of the block-based storage system hosting a replica (primary or secondary) of the logical volume are communicating with an up-to-date membership of a membership group of computing devices that are currently storing replicas (primary or secondary) for the logical volume. For example, when a secondary node (e.g. computing device storing a secondary replica) is promoted to be a primary node (e.g. computing device storing a primary replica), client computing devices need to direct reads and writes to the promoted primary node (previous secondary node) and a previous primary node that has been superseded needs to cease to accept write requests or author reads in order to avoid supplying stale read data or committing writes at a stale node. Also, replication in response to writes needs to be performed by an up-to-date membership of a membership group of computing devices that are currently storing replicas (primary or secondary) for the logical volume.

In some embodiments, in order to ensure up-to date membership is enforced a sequence number may be associated with each membership group and any changes in the membership of the membership group may cause a new updated sequence number to be authorized. For example, the loss of a primary node from a membership group, the promotion of a secondary node to a primary node, the addition of a secondary node, the loss of a secondary node, etc. may cause a new updated sequence number to be authorized.

In some embodiments, a membership group authority of a block-based storage service may maintain a store storing a latest authorized sequence number for a given logical volume or logical volume partition along with membership information for a membership group associated with the latest authorized sequence number. Each member of the membership group may be provided the latest authorized sequence number and may locally store the latest authorized sequence number provided to the respective member of the membership group (e.g. computing device or node storing a primary or secondary replica). Also, communications between the members of the membership group may include a latest authorized sequence number known by the member authoring the communication. Members of the membership group may compare a sequence number included in a communication to a locally stored latest authorized sequence number to ensure the sender and receiver of the communication are on the same sequence number (e.g. neither node has become stale). Also, a primary node may seek verification from secondary nodes of a membership group that the secondary nodes are on the same sequence number as the primary node when responding to a communication.

In some embodiments, a first client computing device may be unable to connect to a given computing device of a block-based storage system, such as a node storing a primary replica of a logical volume to which the client computing device is attempting to connect. This can cause the first client computing device to initiate a transition/failover request, whereby the first client computing device identifies the server storing the secondary replica of the logical volume and attempts to establish a connection with this other server. However, a second client computing device may still be able to connect to the given computing device of the block-based storage system. Also, the second client computing device may be unable to connect to the other server of the block-based storage system.

For example, a network partition may divide a network such that a first client computing device and a first node storing a primary replica are on one side of the network partition and a second client computing device and a second node storing a secondary replica are on another side of the network partition. If the second client computing device successfully causes the second node currently storing the secondary replica to be promoted to primary replica, the first client computing device will be cut off from the newly promoted primary replica node. This may in turn cause the first client computing device to cause another node on the same side of the network partition storing a secondary replica to be promoted to a primary replica node, thus cutting of the second client computing device on the other side of the network partition. However, in some embodiments, in order to avoid such unnecessary flip flops between primary and secondary nodes or a situation of continuous flipping between primary and secondary nodes, a health check application programmatic interface (API) may be implemented on nodes of a block-based storage system.

For example, in some embodiments, a computing device of a block-based storage system storing a secondary replica (e.g. secondary replica node) of a logical volume, prior to initiating a transition in response to a connect request from a client computing device, may send a request to a health check API of a computing device of the block-based storage service storing a primary replica of the logical volume (e.g. primary replica node). If the primary replica node replies with health information indicating that the primary replica node is healthy, the node storing the secondary replica may refrain from initiating a transition/failover. However, if the primary replica node fails to response in a threshold amount of time or responds with health information indicating that the primary replica node is unhealthy, the secondary replica node may proceed with initiating a transition/failover to assume the role of primary replica node for the logical volume partition.

In some embodiments, a primary replica node may be considered healthy in regards to determining whether or not to initiate a transition/failover based on whether or not the node storing the primary replica remains attached to at least one client computing device. In other embodiments, a node storing a primary replica may be considered healthy in regards to determining whether or not to initiate a transition/failover based on whether the node storing the primary replica remains connected to a majority of client computing devices associated with the logical volume. In some embodiments, a node storing a primary replica may be considered healthy in regards to determining whether or not to initiate a transition/failover based on whether the node storing the primary replica remains connected to a client computing device generating a greatest volume of IO traffic (e.g. read requests and write requests) directed to the logical volume of a group of client computing devices associated with the logical volume. In some embodiments, other considerations may be used to determine whether a node storing a primary replica is healthy in regards to determining whether or not to initiate a transition/failover.

In some embodiments, a transition/failover may comprise a "flip" transition (e.g. primary and secondary replicas change roles) or a failover transition (e.g. promotion of a secondary replica to a role of primary and appointment of a replacement secondary replica). In some embodiments, whether a "flip" transition or failover is to be performed may be selected based on a health of a current primary node determined based on health check information received from a health check API of the current primary node.

According to some embodiments, a system includes a plurality of computing devices configured to implement a block storage system. The block storage system is configured to connect a first client computing device to a logical volume of a plurality of logical volumes of the block storage system, wherein the first client computing device connects to the logical volume via a first computing device of the block storage system storing a primary replica of the logical volume. The block storage service is also configured to connect a second client computing device to the logical volume via the first computing device storing the primary replica of the logical volume. At least one of the plurality of computing devices of the block storage system is configured to implement a membership group authority for the block storage system. The membership group authority is configured to store a current sequence number for a membership group for the logical volume, wherein the membership group defines which of the plurality of computing devices of the block storage system store the primary replica of the logical volume and which of the plurality of computing devices of the block storage system store one or more secondary replicas of the logical volume. The membership group authority is also configured to authorize a new sequence number for an updated version of the membership group due to a change in membership of the computing devices of the block storage system included in the membership group for the logical volume. Additionally, the membership group authority is configured to decline to authorize a new sequence number if a sequence number submitted with a request for the new sequence number is less than or equal to a greatest authorized sequence number previously authorized for the logical volume. Moreover, respective computing devices of the membership group for the logical volume are configured to locally store a latest sequence number for the membership group authorized by the membership group authority that has been presented to the respective computing device and verify that a sequence number included in a communication directed to the respective computing device from one or more other computing devices of the membership group includes the latest sequence number for the logical volume locally stored by the respective computing device.

According to some embodiments, a method includes receiving a read request at a first computing device storing a primary replica for a logical volume. The method also includes sending a verification request to a second computing device storing a secondary replica for the logical volume, wherein the request causes the first computing device or the second computing device to verify that a sequence number locally stored at the first computing device for the logical volume corresponds with a sequence number locally stored at the second computing device for the logical volume. The method also includes refraining from sending requested read data in response to the read request until the first or second computing device verifies that the sequence number for the logical volume locally stored at the first computing device storing the primary replica corresponds with the sequence number for the logical volume stored locally on the second computing device storing the secondary replica.

According to some embodiments, non-transitory, computer-readable storage media store program instructions that, when executed on or across one or more processors, cause the one or more processors to propose a sequence number for a membership group for a logical volume to a membership group authority, wherein the proposed sequence number is greater than a greatest sequence locally stored for the logical volume. The program instructions also cause the one or more processors to receive an indication from the membership group authority that the proposed sequence number has been authorized for the logical volume as a new sequence number, wherein the new sequence number is associated with a membership group for the logical volume. Additionally, the program instructions cause the one or more processors to provide the sequence number and information about the associated membership group to the members of the membership group for the logical volume, wherein the members of the membership group store replicas of the logical volume.

According to some embodiments, a system includes a plurality of computing devices configured to implement a block storage system. The block storage system is configured to connect a first client computing device to a logical volume of a plurality of logical volumes hosted by the block storage system, wherein the first client computing device connects to the logical volume via a first computing device of the block storage system storing a primary replica of the logical volume. Also, the block storage system is configured to connect one or more additional client computing devices to the logical volume via the first computing device storing the primary replica of the logical volume. Additionally, a computing device of the block storage system storing a secondary replica of the logical volume is configured to receive a request, from the first client computing device or one of the one or more additional client computing devices, requesting to connect to the computing device storing the secondary replica such that the computing device storing the secondary replica assumes a role of primary replica for the logical volume. In response to receive the request, the computing device storing the secondary replica of the logical volume is configured to send a request to a health check application programmatic interface (API) of the first computing device storing the primary replica, wherein the health check API is configured to return health information for the first computing device. Also, the computing device storing the secondary replica of the logical volume is configured to, in response to receiving health information indicating that the first computing device remains attached to the first client computing device or at least one of the one or more additional client computing devices, refrain from initiating a transition to assume the role of primary replica for the logical volume.

According to some embodiments, a method includes receiving a request from a first client computing device or one of one or more additional client computing devices requesting to connect to a computing device storing a secondary replica of a logical volume such that the computing device storing the secondary replica assumes a role of primary replica for the logical volume, wherein multiple client computing devices are connected to the logical volume. The method further includes sending a request to a health check application programmatic interface (API) of a first computing device storing a primary replica of the logical volume, wherein the health check API is configured to return health information for the first computing device. Additionally, the method includes determining, by the computing devices storing the secondary replica, to initiate a transition to assume the role of primary replica for the logical volume based on health information for the first computing device storing the primary replica.

According to some embodiments, one or more non-transitory, computer-readable storage media store instructions that when executed on or across one or more processors cause the one or more processors to receive a request from a first client computing device or one of one or more additional client computing devices requesting a computing device hosting a secondary replica of a logical volume assume a role of primary replica for the logical volume, wherein multiple client computing devices are attached to the logical volume. The program instructions further cause the one or more processors to send a request to a health check application programmatic interface (API) of a first computing device hosting or previously hosting a primary replica for the logical volume, wherein the health check API is configured to return health information for the first computing device. Additionally, the program instructions cause the one or more processors to determine to initiate a transition based on a health of the first computing device hosting or previously hosting the primary replica.

FIG. 1 is a block diagram illustrating a provider network 102 that includes a block-based storage service that supports multi-attach volumes, according to some embodiments. The provider network 102 can be a cloud provider network, or "cloud," which refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

In some embodiments, provider network 102 includes block-based storage service 104, and a plurality of client computing devices, such as compute instances 136, 138, and 140, that are attached to one or more logical volumes implemented by the block-based storage service, such as logical volume 1 (124), logical volume 2 (126), and logical volume N (128). The compute instances 136, 138, and 140, can perform I/O operations at the primary replica of logical volume 1 (124) via their respective clients 162, 164, and 166. The clients 162, 164, and 166 represent instructions for the compute instances 136, 138, and 140 to establish connections with, and handle I/O to, remote volumes (e.g., volumes accessed over a network). A client may be implemented on an offload card of a server that includes the processing units (e.g., CPUs or GPUs) of a compute instance. In some embodiments, a block-based storage service may include any number of computing devices, such as computing devices 106 and 108 through 110 that include physical storage devices used to store replicas for any number of logical volumes, or partitions, thereof, hosted by the block-based storage service.

In some embodiments, a provider network may perform compute services, storage services, networking services, and/or other services for users of the provider network. For example, user computing devices 160 are connected to provider network 102 via network 150 and may be users or clients of the provider network that includes the block-based storage service 104. In some embodiments, users may be provisioned client computing devices of a provider network, such as portions of computing devices that implement computing instances 136, 138, and 140. Furthermore, a logical volume may be provisioned to for use by a user and attached to the user's computing instance. For example, client applications 162, 164, and 166 running on compute instances 136, 138, and 140 are connected via connections 142 to logical volume 1 (124) via computing device 106 hosting primary replica 112 of logical volume 1 (124).

In some embodiments, each logical volume may be implemented via multiple replicas stored on multiple separate computing devices. In some embodiments, different replicas of a logical volume may be stored by computing devices in different data centers, different availability zones, etc. For example, these different storage locations may reduce the likelihood of correlated failures of replicas for a logical volume such as due to a power failure, a network failure, etc. In some embodiments, a primary and a secondary replica may be stored for each logical volume, or partition thereof, by a different computing device in a different data center, availability zone, etc. Also, in some embodiments, "N" replicas may be stored for each logical volume, or partition thereof, by three or more different computing devices in three or more different data centers, availability zones, etc. of a provider network, such as provider network 102.

For example, logical volume 1 (124) is implemented via computing device 106 storing primary replica 112 and computing device 108 storing secondary replica 118. Also, logical volume 2 (126) is implemented via computing device 110 storing primary replica 120 and computing device 106 storing secondary replica 114. Additionally, a block-based storage service, such as block-based storage service 104, may support any number of additional logical volumes "N." As another example, logical volume "N" (128) is implemented via computing device 108 storing primary replica 116 and computing device 110 storing secondary replica 122. In some embodiments, computing devices 106, 108, and 110 may be located in different failure impact zones, such as different racks within a computing room, different computing rooms within a data center, different data centers within an availability zone, or in different availability zones of a provider network, as a few examples.

In addition, block-based storage service 104 may include a block-based storage service control plane, such as block-based storage service control plane 130. The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

The block-based storage service control plane may determine placement of a logical volume on a given set of computing devices or may work with a computing device during a failover to identify a computing device to host a replacement replica. In some embodiments, a block-based storage service control plane, such as block-based storage service control plane 130, may balance IO load, data storage requirements, etc. when selecting computing devices to host a primary or a secondary replica of a logical volume. In some embodiments, a block-based storage service control plane, such as block-based storage control plane 130, may perform other management tasks for managing the block-based storage service such as those further described herein.

In some embodiments, a block-based storage service, such as block-based storage service 104, may further include a membership group authority, such as membership group authority 132. In some embodiments, the membership group authority may authorize, or decline to authorize, proposed new sequence numbers for an associated membership group based on whether or not the proposed sequence number is a next sequence number in a sequence that has not yet been authorized for a logical volume, or partition thereof. In some embodiments, a sequence number may be represented by a 64-bit number. In some embodiments, a sequence number may be a monotonically increasing integer, wherein each successive sequence number is greater than a previous sequence number by "1." In some embodiments, a membership group authority, such as membership group authority 132, includes a membership group and sequence number store, such as membership group and sequence number store 134. In some embodiments, a membership group and sequence number store stores a greatest sequence number and associated membership group information for each logical volume, or partition thereof, hosted by a block-based storage service, such as block-based storage service 104.

For example, membership group and sequence number store 134 stores a sequence number of "4" for logical volume 1 along with associated membership group information indicating that for sequence number "4" computing device 106 is the primary node storing primary replica 112 and computing device 108 is the secondary node storing secondary replica 118. Additionally, membership group and sequence number store 134 stores a sequence number of "1" for logical volume 2 along with associated membership group information indicating that for sequence number "1" computing device 110 is the primary node storing primary replica 120 of logical volume 2 and computing device 106 is the secondary node storing secondary replica 114 of logical volume 2. Also, membership group and sequence number store 134 stores a sequence number of "2" for logical volume N along with associated membership group information indicating that for sequence number "2" computing device 108 is the primary node storing primary replica 116 of logical volume N and computing device 110 is the secondary node storing secondary replica 122 of logical volume N.

In some embodiments, all members of a membership group for a logical volume, or partition thereof, locally store a latest sequence number and associated membership group information for a logical volume for a replica stored on the respective computing device of the block-based storage service. For example, computing device 106 of block-based storage service 104 locally stores a latest sequence number and membership group information for logical volumes 1 and 2. Also, computing device 108 locally stores a latest sequence number and membership group information associated with the latest sequence number for logical volumes 1 and N. Additionally, computing device 110 locally stores a latest sequence number and membership group information associated with the latest sequence number for logical volumes 2 and N. The locally stored latest authorized sequence numbers are the latest sequence numbers for the given logical volume that have been seen by the respective computing device locally storing the respective sequence number. However, as discussed in more detail below, a situation may arise wherein a new sequence number that is larger (and later) than a locally stored sequence number has been authorized by a membership group authority, such as membership group authority 132, but has not yet been received or seen by a given computing device storing an out-of-date locally stored sequence number. Additionally, each client computing device connected to a given logical volume may locally store a latest sequence number for the logical volume. For example each of client computing devices 136, 138, and 140 locally store sequence number 4 and associated membership group information for logical volume 1 (124) to which client computing devices 136, 138, and 140 are connected.

In some embodiments, communications between nodes hosting a given logical volume, such as between computing devices 106 and 108 each hosting a replica of logical volume 1 (124) may include a latest sequence number locally stored by the entity sending the communication. An entity receiving the communication may verify that the sequence number included with the communication matches a locally stored sequence number and may further seek verification that the sequence number included with the communication matches sequence numbers locally stored by other members of the membership group, such as computing devices storing secondary replicas for the same logical volume. In some embodiments, agreement between primary and secondary nodes is a prerequisite for performing 10, such as reads and writes. By enforcing sequence number agreement, writes to a stale primary node or reads from a stale primary node may be avoided.

In some embodiments, a block-based storage service, such as block-based storage service 104, may be implemented in an asynchronous network environment, meaning that messages between nodes of the asynchronous network may be delayed or delivered out of order. However, as briefly discussed above and discussed in more detail below, enforcement of sequence number agreement may prevent writes to a stale primary node or reads from a stale primary node is such an asynchronous network environment. In some embodiments, enforcement of sequence number agreement along with requiring replication verification before committing a write may assure consistency in a distributed storage system, such as in block-based storage service 104. In some embodiments, replicated writes may include an ID of a current primary node sending the replicated write to a secondary node along with a sequence number locally stored by the primary node sending the replicated write. In some embodiments, a write will not be confirmed if a sequence number of a secondary node does not match a sequence number included with a replicated write request. In a similar manner, a primary node may verify that secondary nodes locally store sequence numbers matching a sequence number locally stored by a primary node performing a read. These verifications may be satisfied before the primary node sends the requested read data to the client computing device requesting the read or commits write data and sends a write acknowledgement to the client computing device requesting the write.

In some embodiments, a new logical volume may initially be placed on a single computing device (e.g. node) with a sequence number of zero. Thus, the membership group information for the sequence number "0" would be the ID of the solo primary node. Then, once a secondary replica is implemented on another computing device (e.g. a secondary node), a new sequence number "1" may be authorized and associated with a membership group comprising the primary node and the secondary node.

In some embodiments, during a transition or failover a new primary node may be selected from a set of nodes that were previously secondary nodes for a logical volume (e.g. computing devices storing secondary replicas for the logical volume). By requiring at least one node to overlap between sequential membership groups, ordered transitions may be achieved. For example, a secondary node will already be storing a replica of the logical volume, or partition thereof, when promoted to primary node.

This specification continues with a general description of a provider network, which may implement multi-attach logical volumes of a block-based storage service that are accessed by virtual compute instances offered by a virtual compute service.

Figure 2:
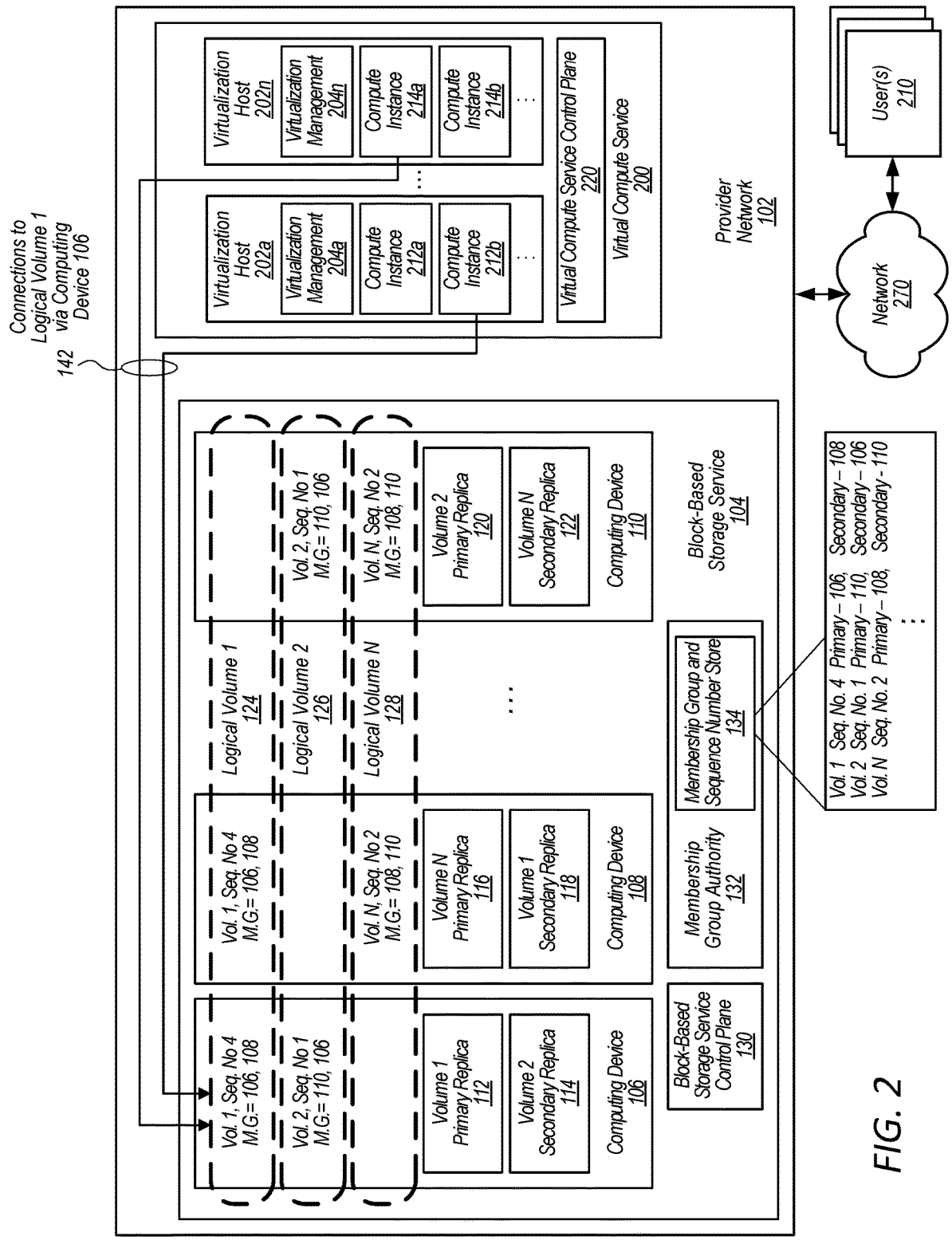
FIG. 2 is a block diagram illustrating a provider network that includes a virtualized computing resource service and a block-based storage service that supports multi-attach volumes, according to some embodiments.

FIG. 2 is a block diagram illustrating a provider network that includes a virtualized computing resource service and a block-based storage service that supports multi-attach volumes, according to some embodiments.

Provider network 102 may be set up by an entity such as a company or a public sector organization to provide one or more services (such as various types of cloud-based computing or storage) accessible via the Internet and/or other networks to users 210. Provider network 102 may include numerous data centers hosting various resource pools, such as collections of physical and/or virtualized computer servers, storage devices, networking equipment and the like (e.g., computing system 1300 described below with regard to FIG. 13), needed to implement and distribute the infrastructure and services offered by the provider network 102. In some embodiments, provider network 102 may provide computing resources, such as virtual compute service 200, storage services, such as block-based storage service 104, and/or any other type of network-based services. Users 210 may access these various services offered by provider network 102 via network 270. Likewise network-based services may themselves communicate and/or make use of one another to provide different services. For example, computing resources offered to users 210 in units called "instances," such as virtual or physical compute instances, may make use of particular logical data volumes, such as logical volume 1 (124), logical volume 2 (126), logical volume N (128), etc., providing virtual block-based storage for the compute instances.

As noted above, virtual compute service 240 may offer various compute instances, such as compute instances 212*a*, 212*b*, 214*a*, and 214*b* to users 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 200 in different embodiments, including special purpose computer servers, storage devices, network devices and the like. In some embodiments instance users 210 or any other user may be configured (and/or authorized) to direct network traffic to a compute instance. In various embodiments, compute instances may mount, connect, attach or map to one or more data volumes, such as logical volume 1 (124), logical volume 2 (126), logical volume N (128) provided by block-based storage service 104 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

As illustrated in FIG. 2, a virtualization host, such as virtualization hosts 202*a* and 202*n*, may implement and/or manage multiple compute instances 212*a*, 212*b*, 214*a*, and 214*b* respectively, in some embodiments, and may be one or more computing devices, such as computing system 1300 described below with regard to FIG. 13. Virtualization hosts 202 may also provide multi-tenant hosting of compute instances. For example, in some embodiments, one virtualization host may host a compute instance for one entity (e.g., a particular client or account of virtual computing service 210), while another compute instance hosted at the same virtualization host may be hosted for another entity (e.g., a different account). A virtualization host may include a virtualization management module, such as virtualization management modules 204*a* and 204*n* capable of instantiating and managing a number of different client-accessible virtual machines or compute instances. The virtualization management module may include, for example, a hypervisor and an administrative instance of an operating system, which may be termed a "domain-zero" or "dom0" operating system in some implementations. The dom0 operating system may not be accessible by clients on whose behalf the compute instances run, but may instead be responsible for various administrative or control-plane operations of the network provider, including handling the network traffic directed to or from the compute instances.

Virtual computing service 200 may implement control plane 220 to perform various management operations. For instance, control plane 220 may implement resource management to place compute instances, and manage the access to, capacity of, mappings to, and other control or direction of compute instances offered by provider network. Control plane 220 may provide both a direct sell and $3^{rd}$ party resell market for capacity reservations (e.g., reserved compute instances). For example, control plane 250 may allow users 210 to learn about, select, purchase access to, and/or reserve capacity for computing resources, either from an initial sale marketplace or a resale marketplace, via a web page or via an API. For example, control plane 220 may provide listings of different available compute instance types, each with a different credit accumulation rate. Control plane 220 may also offer and/or implement a flexible set of resource reservation, control and access interfaces for users 210 via an interface (e.g., API). For example, control plane 220 may provide credentials or permissions to users 210 such that compute instance control operations/interactions between clients and in-use computing resources may be performed.

In various embodiments, control plane 220 may track the consumption of various computing instances consumed for different virtual computer resources, clients, user accounts, and/or specific instances. In at least some embodiments, control plane 220 may implement various administrative actions to stop, heal, manage, or otherwise respond to various different scenarios in the fleet of virtualization hosts 202 and instances 212, 214. Control plane 220 may also provide access to various metric data for client(s) 210 as well as manage client configured alarms. In various embodiments, control plane 220 may implement billing management. Control plane 220 may be configured to detect billing events (e.g., specific dates, times, usages, requests for bill, or any other cause to generate a bill for a particular user account or payment account linked to user accounts). In response to detecting the billing event, billing management module may be configured to generate a bill for a user account or payment account linked to user accounts.

In various embodiments, provider network 102 may also implement block-based storage service 104 for performing storage operations. Block-based storage service 104 illustrated in FIG. 2 may be the same as or similar to block-based storage service 104 illustrated in FIG. 1. Block-based storage service 104 is a storage system, composed of a pool of multiple independent resource hosts, such as computing devices 106 through 110 (e.g., server block data storage systems), which provide block level storage for storing one or more sets of data volumes, such as logical data volume(s) 1 (124) through "N" (128). Data volumes may be attached, mounted, mapped, or otherwise connected to particular client computing devices (e.g., a virtual compute instance of virtual compute service 200), providing virtual block-based storage (e.g., hard disk storage or other persistent storage) as a contiguous set of logical blocks. In some embodiments, a logical data volume may be divided up into multiple data chunks or partitions (including one or more data blocks) for performing other block storage operations, such as snapshot operations or replication operations. A volume snapshot of a data volume may be a fixed point-in-time representation of the state of the data volume. In some embodiments, volume snapshots may be stored remotely from a storage host maintaining a data volume, such as in another storage service of a provider network (not shown). Snapshot operations may be performed to send, copy, and/or otherwise preserve the snapshot of a given data volume in another storage location, such as a remote snapshot data.

Block-based storage service 104 may implement block-based storage service control plane 130 to assist in the operation of block-based storage service 104. In various embodiments, block-based storage service control plane 130 assists in managing the availability of block data storage to clients, such as programs executing on compute instances provided by virtual compute service 200 and/or other network-based services located within provider network 102 and/or optionally computing systems (not shown) located within one or more other data centers, or other computing systems external to provider network 102 available over a network 270. Access to data volumes may be provided over an internal network within provider network 102 or externally via network 270, in response to block data transaction instructions.

Block-based storage service control plane 130 may provide a variety of services related to providing block level storage functionality, including the management of user accounts (e.g., creation, deletion, billing, collection of payment, etc.). Control plane 130 may implement capacity management, which may generate and manage a capacity model for block-based storage service 104, and may direct the performance of responsive actions based on the capacity of block-based storage service 104. Block-based storage service control plane 130 may further provide services related to the creation, usage and deletion of data volumes in response to configuration requests. Block-based storage service control plane 130 may also provide services related to the creation, usage and deletion of volume snapshots on other storage services. Block-based storage service control plane 130 may also provide services related to the collection and processing of performance and auditing data related to the use of data volumes and snapshots of those volumes.

Users 210 may encompass any type of client configurable to submit requests to provider network 102. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a logical data volume, or other network-based service in provider network 102 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, users 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or a logical data volume in a manner that is transparent to applications implement on the client 210 utilizing computational resources provided by the compute instance or block storage provided by the logical data volume.

Users 210 may convey network-based service requests to provider network 102 via external network 270. In various embodiments, external network 270 may encompass any suitable combination of networking hardware and protocols necessary to establish network-based communications between users 210 and provider network 200. For example, a network 270 may generally encompass the various telecommunications networks and service providers that collectively implement the Internet. A network 270 may also include private networks such as local area networks (LANs) or wide area networks (WANs) as well as public or private wireless networks. For example, both a given client 210 and provider network 102 may be respectively provisioned within enterprises having their own internal networks. In such an embodiment, a network 270 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 102. It is noted that in some embodiments, users 210 may communicate with provider network 102 using a private network rather than the public Internet.

In some embodiments, multiple resource hosts, such as computing devices 1-6, 108, and 110, may be implemented in order to provide block-based storage services. A resource host may be one or more computing systems or devices, such as a storage server or other computing system (e.g., computing system 1300 described below with regard to FIG. 13). Each resource host may maintain respective replicas of logical volumes, or partitions thereof. Some logical volumes may differ in size from other logical volumes, in some embodiments. Resource hosts may also provide multi-tenant storage. For example, in some embodiments, one resource host may maintain a replica of a logical volume for one account of block-based storage service 104, while another logical volume replica is maintained at the same resource host, which may be maintained for a different account. Resource hosts, such as computing devices 106, 108, and 110, may persist their respective logical volume replicas in one or more block-based storage devices (e.g., hard disk drives, solid state drives, etc.) that may be directly attached to a computing system or device implementing the respective resource host. Resource hosts may implement different persistent storage devices. For example, some resource hosts may implement solid state drives (SSDs) for persistent block storage, while other resource hosts may implement hard disk drives (HDDs) or other magnetic-based persistent storage devices. In this way different volume types, specifications, and other performance characteristics may be provided according to the persistent storage devices implemented at the resource host.

Block-based storage service 104 may manage and maintain logical volume replicas in a variety of different ways. Different durability schemes may be implemented for some logical volumes among two or more resource hosts as a distributed resource maintaining a same replica of a logical volume at different partitions of the logical volume. For example, different types of mirroring and/or replication techniques may be implemented (e.g., RAID 1) to increase the durability of logical volume, such as by eliminating a single point of failure for a logical volume. In order to provide access to a logical volume, resource hosts may then coordinate I/O requests (e.g. input/output requests), such as write requests, among the two or more resource hosts maintaining a replica of a data volume. For example, for a given data volume, one resource host may serve as a primary resource host (e.g. primary node). A primary resource host may, in various embodiments, receive and process requests (e.g., I/O requests) from clients of the logical volume. Thus, the primary resource host may then coordinate replication of I/O requests, such as write requests, or any other changes or modifications to the logical volume to one or more other resource hosts serving as secondary resource hosts (e.g. secondary nodes). Thus, when a write request is received for the logical volume at a primary resource host, the primary resource host may forward the write request to the secondary resource host(s) and wait until the secondary resource host(s) acknowledges the write request as complete before completing the write request at the primary resource host.

Please note, that in some embodiments, the role of primary and secondary resource hosts may be assigned per logical volume. For example, for a logical volume maintained at one resource host, the resource host may serve as a primary resource host. While for another logical volume maintained at the same resource host, the resource host may serve as a secondary resource host. Resource hosts may implement respective I/O managers. The I/O managers may handle I/O requests directed toward logical volumes maintained at a particular resource host. Thus, I/O managers may process and handle a write request to a logical volume replica at a resource host, for example. I/O managers may be configured to process I/O requests according to a block-based storage service application programming interface (API) and/or other communication protocols, such as such as internet small computer system interface (iSCSI). Primary resource hosts may direct other operations for logical volumes, like snapshot operations or other I/O operations (e.g., serving a read request). In some embodiments, I/O managers of resource host(s) may allocate processing capacity to provide access to data volumes stored at resource host(s), such as by allocating IOPS, throughput, or other resources, to provide specified performance for data volumes.

Resource hosts may be located within different infrastructure localities. Infrastructure localities may be defined by devices, such as server racks, networking switches, routers, or other components, power sources (or other resource host suppliers), or physical or geographical locations (e.g., locations in a particular row, room, building, data center, fault tolerant zone, etc.). Infrastructure localities may vary in scope such that a resource host (and replicas of data volumes implemented on the resource host) may be within multiple different types of infrastructure localities, such as a particular network router or brick, a particular room location, a particular site, etc.

In at least some embodiments, control plane 130 may implement host data collection to collect information, metrics, metadata, or any other information for performing volume creating or managing logical volumes. Host data collection may periodically sweep resource host(s) (e.g. computing devices 106 through 110) with a query for information, metrics, or metadata. For example, resource hosts may provide current utilization metrics, ongoing tasks or operations (e.g., such as migration or remirror tasks), and any other state information for the resource host, including volume specific information for volume replicas residing at the resource hosts. In some embodiments, host data collection may aggregate the data according to infrastructure localities, partitions, resource hosts, or other granularities for block-based storage service 104. Host data collection may store the data at volume state store, which may persistently maintain the collected data. In some embodiments, a volume state store may be implemented as a database or otherwise searchable/query-able storage system to provide access to other components of control plane 130.

Control plane 130 may implement connection management to direct the establishment of a connection between logical volumes and other client resources, such as an instance or client computing device. For example, a connection request may be received for a virtual compute instance. Connection management may notify a creation engine to create a logical volume to be connected to the virtual compute instance. Connection management may generate the necessary credentials (e.g., tokens, lease identifiers, or keys) to provide to the virtual compute instance, as well as notify the resource host(s) that will host a primary replica of the created logical volume of the virtual compute instances access rights. In at least some embodiments, resource host(s) may restrict access to a created data volume to those client resources that are identified according to the provided credentials.

In some embodiments, the client computing devices as illustrated in FIG. 1, such as client computing devices 136, 138, and 140, may be computing instances of a virtual compute service, wherein the different client computing devices are implemented on different virtualization hosts of the virtual compute service that have different network connections to a given computing device of a block-based storage service hosting a primary replica.

Figure 3:
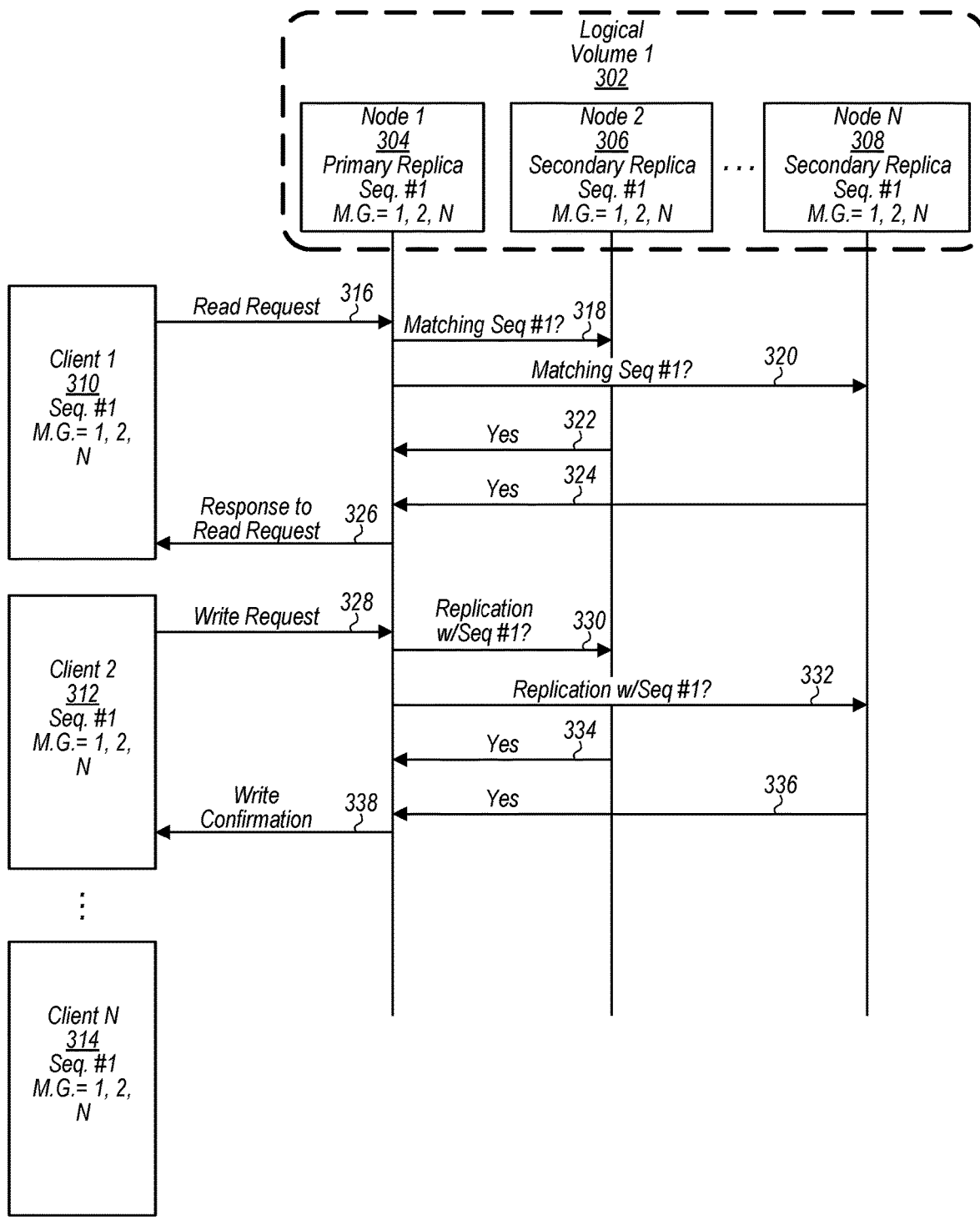
FIG. 3 is a diagram illustrating interactions regarding a read request and a write request between nodes that implement a logical volume and multiple clients attached to the logical volume, according to some embodiments.

FIG. 3 is a diagram illustrating interactions regarding a read request and a write request between nodes that implement a logical volume and multiple clients attached to the logical volume, according to some embodiments.

FIG. 3 illustrates a logical volume 1 (302) implemented via node 1 (304), node 2 (306) and node "N" (308) of a block-based storage service. For example, in some embodiments, nodes 1, 2, and "N" may be computing devices of a block-based storage service, such as computing devices 106, 108, and 110 of block-based storage service 104 illustrated in FIGS. 1 and 2. FIG. 3 also illustrates client computing devices attached to logical volume 1 (302). The client computing devices include client 1 (310), client 2 (312) and client "N" (314). In some embodiments any number of client computing devices may be attached to a logical volume. In some embodiments, clients 1-N may be client computing devices such as client computing devices 136, 138, and 140 as illustrated in FIG. 1 or may be compute instances of a virtual computing service, such as illustrated in FIG. 2.

Under normal conditions, (e.g. no failure or transition/failover in progress) each node implementing a logical volume may locally store a latest sequence number and membership group information for the logical volume, wherein the nodes store the same sequence number and membership group information for the logical volume. For example, node 1 (304), node 2 (306) and node "N" (308) all locally store sequence number "1" as a latest authorized sequence number for logical volume 1 (302). Also, node 1 (304), node 2 (306) and node "N" (308) all locally store membership group information indicating that nodes 1, 2, and N are included in a membership group associated with sequence number "1" for logical volume 1 (302). In some embodiments, an order in which members are listed in membership group information may indicate relative priorities of the members. For example, the ordering of node 1 before nodes 2 and "N" may indicate that node 1 is a primary node for the logical volume and nodes 2 and "N" are secondary nodes for the logical volume (e.g. node 1 stores a primary replica and nodes 2 and "N" store secondary replicas).

In some embodiments, each client computing device connected to a logical volume, such as client 1 (310), client 2 (312), and client "N" (314), may locally store a latest sequence number for the logical volume and associated membership group information. For example nodes 1 (304), 2 (306), and 3 (308) each store sequence number "1" for logical volume 1 (302) and membership group information indicating that node 1 (304) is a primary node for the logical volume 1 (302) and nodes 2 (306) and "N" (308) are secondary nodes for the logical volume 1 (302) (e.g. they store secondary replicas of the logical volume).

At 316, client 1 (310) sends a read request 316 to primary node 1 (304). In response to receiving the read request 316, the primary node 1 (304) is configured to send a sequence number verification request to other members of the membership group to verify that another member of the membership group has not moved on to a larger sequence number, thus potentially leaving primary node 1 as a stale primary node that has been superseded.

For example, primary node 1 (304) sends sequence number verification requests 318 and 320 to node 2 (306) and node "N" (308), respectively. In response, nodes 2 (306) and "N" (308) send messages 322 and 324 that can be used to verify up-to-date sequence numbers between the nodes. In some embodiments, the secondary nodes, such as node 2 (306) and node "N" (308) may perform a verification of matching sequence numbers and send a confirmation or declination message. In other embodiments, the secondary nodes, such as node 2 (306) and node "N" (308) may send a message comprising their respective locally stored sequence numbers and a primary node, such as primary node 1 (304) may perform a verification of matching sequence numbers. If any of the matching sequence number verifications fail, the primary node 1 (304) may decline to perform the request read. In some embodiments, the primary node 1 (304) may refer the requesting client to a membership group authority to obtain a latest up-to-date sequence number and membership information for the logical volume. In some embodiments, the primary node 1 (304) may provide along with a message declining to perform the read, a latest sequence number and membership group information for the logical volume. In such cases, a client, such as client 1(310), may then contact a primary node indicated in the membership group information associated with the latest sequence number for the logical volume to perform the read. The client may then direct the read request to a latest primary node.

If both of the messages 322 and 324 indicate that the secondary nodes 306 and 308 locally store a matching sequence number as stored at primary node 1 (304), the primary node may send read response 326 to client 1 (310). Because, primary node 1 (304) has verified that no other nodes have superseded the primary node, the primary node 1 (304) can guarantee to the client 1 (310) that the data included in the read response 326 is the latest version of the data for the logical volume, (e.g. no other writes not reflected in the read data have modified the data prior to the time it was read). In some embodiments, peer confirmation messages, e.g. messages 318, 320, 322, and 324 may be small compared to a size of the data being read. For example the peer confirmation messages may be approximately 200 bytes, as compared to read responses which may comprise, as an example 16 KB.

In some embodiments, a primary node, such as primary node 1 (304), may read data from a local storage in order to fulfill a read request in parallel with sending and receiving peer confirmation messages, e.g. messages 318, 320, 322, and 324. Thus a read latency may be the longer of a) a time required to read the data from the local storage or b) a time required to send and receive peer confirmation messages. However, the latency will not be the sum of the two processes, because they are at least partially performed in parallel, in some embodiments.

As another example, client 2 (312) sends write request 328 to primary node 1 (304). Primary node 1 (304) sends replication requests 330 and 332 to secondary nodes 306 and 308 (e.g. nodes 2 and "N"). The replication requests indicate that primary node 1 (304) is a primary node for the logical volume 1 and also indicate the sequence number (e.g. sequence number "1") locally stored by the primary node. The primary node 1 (304) refrains from committing the requested write data until receiving verification messages 334 and 336 from secondary nodes 306 and 308 (e.g. nodes 2 and "N") that they too are on the same sequence number (e.g. sequence number "1").

In some embodiments, the verification messages 334 and 336 may include information indicating the sequence numbers match, or may include locally stored sequence numbers locally stored by the secondary nodes. In such embodiments, primary node 1 (304) may perform a comparison to determine the sequence numbers match. At 338, after it has been verified that the primary node and secondary nodes are on the same sequence number, the primary node 1 sends a write confirmation 338 to client 2 (312).

Note that the verification messages 334 and 336 may also indicate that the replicated write has been written to a storage of the secondary nodes 306 and 308. Thus, when primary node 1 (304) sends write confirmation message 228, it has been established that the secondary nodes 306 and 308 are on the same sequence number and have successfully stored the replicated write data.

Figure 4A:
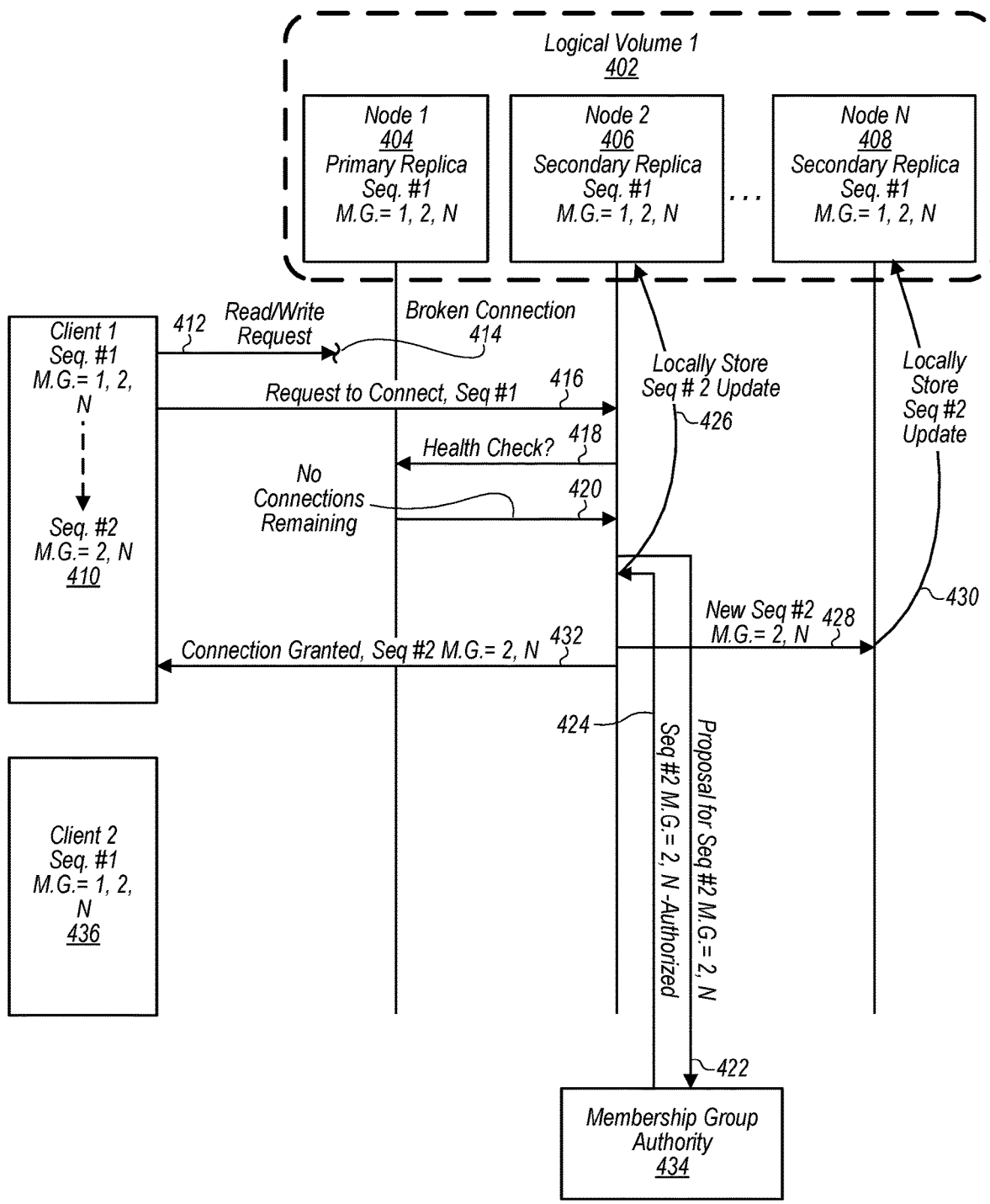
FIGS. 4A-4C are diagrams illustrating interactions between nodes that implement a logical volume, a node that implements a membership group authority, and multiple clients attached to the logical volume, wherein the interactions include a fail over from a primary replica to a secondary replica and the enablement of a replacement secondary replica, according to some embodiments.
Figure 4B:
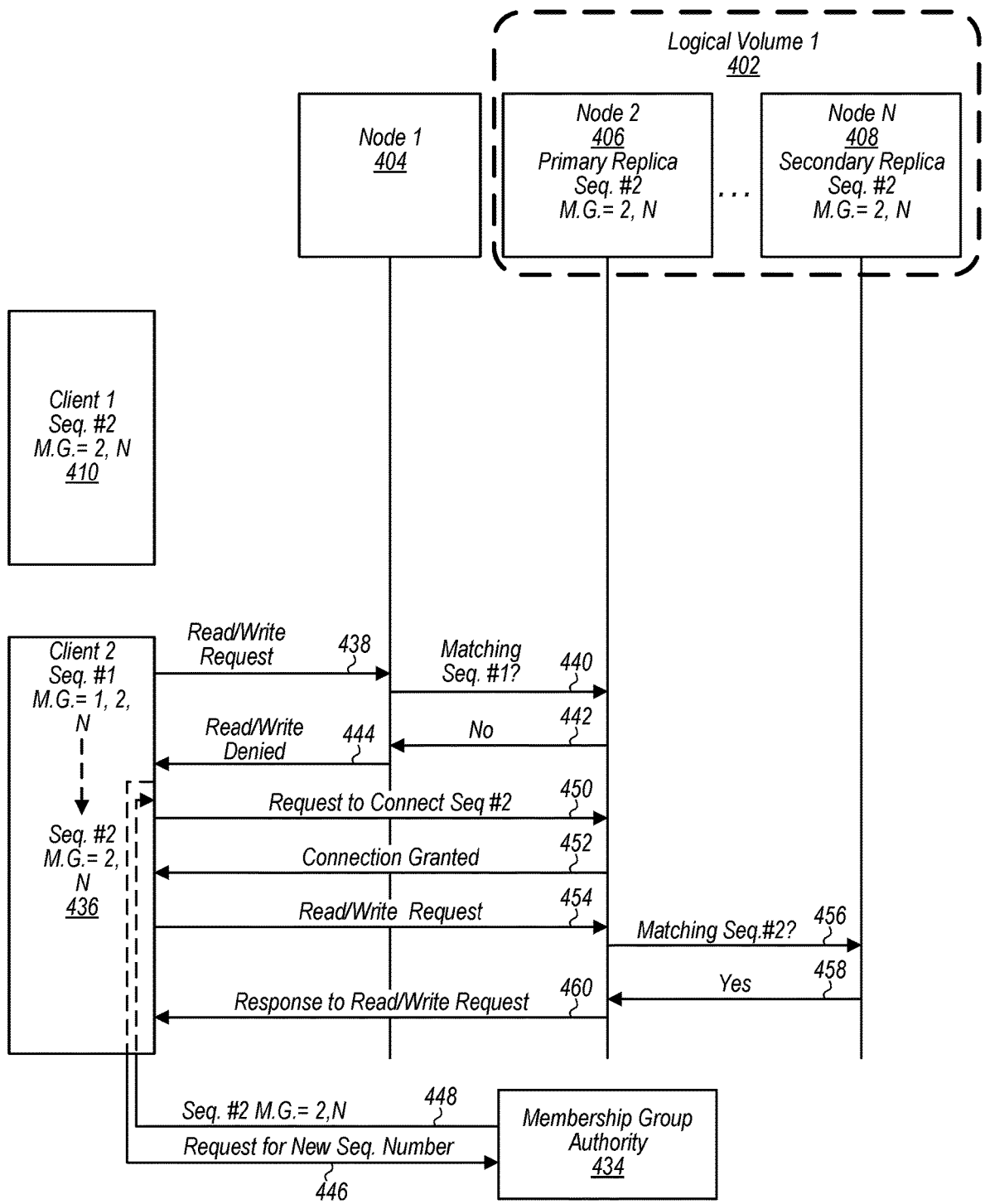
Figure 4C:
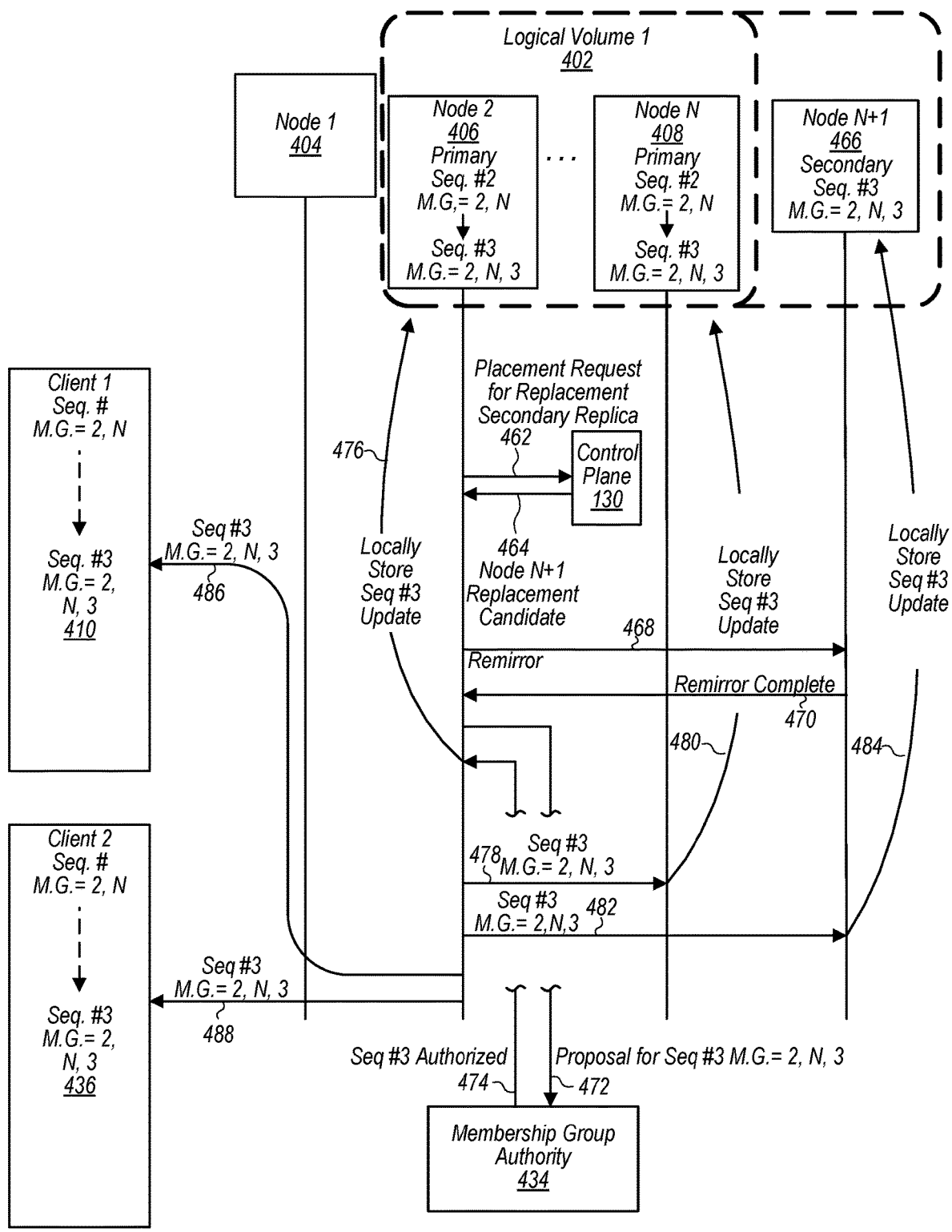

FIGS. 4A-4C are diagrams illustrating interactions between nodes that implement a logical volume, a node that implements a membership group authority, and multiple clients attached to the logical volume, wherein the interactions include a transition/failover from a primary replica to a secondary replica and the enablement of a replacement secondary replica, according to some embodiments.

FIG. 4A illustrates a logical volume 1 (402) implemented via node 1 (404), node 2 (406), and node "N" (408) of a block-based storage system. For example, in some embodiments, nodes 1, 2, and "N" may be computing devices of a block-based storage service, such as computing devices 106, 108, and 110 of block-based storage service 104 illustrated in FIGS. 1 and 2. FIG. 4 also illustrates client computing devices attached to logical volume 1 (402). The client computing devices include client 1 (410) and client 2 (436). In some embodiments any number of client computing devices may be attached to a logical volume. In some embodiments, clients 1 and 2 may be client computing devices such as client computing devices 136, 138, or 140 as illustrated in FIG. 1 or may be compute instances of a virtual computing service, such as illustrated in FIG. 2. In some embodiments, similar components illustrated in FIGS. 3 and FIGS. 4A-4C may perform the actions as illustrated in both FIG. 3 and FIGS. 4A-4C.

Initially, node 1 (404), node 2 (406), and node "N" (408) may locally store sequence number "1" and membership group information indicating that node 1 is a primary node and nodes 2 and N are secondary nodes. Also, clients 1 (410)

and 2 (436) may initially locally store sequence number "1" and membership group information indicating that node 1 is a primary node and nodes 2 and N are secondary nodes.

At 412, client 1 (410) may attempt to send a read or write request to node 1 (404), but the read or write request may not be received at node 1 due to a broken connection 414, due to a failure of node 1, or due to another reason. When the read request or write request 412 is not confirmed within a threshold amount of time (e.g. the request has timed out), client 1 (410) may then attempt to connect to a secondary node for the logical volume as indicated in the locally stored membership group information for the logical volume locally stored by client 1. For example, at 416 client 1 (410) requests to connect to node 2 (406) via request to connect 416.

In some embodiments, the request to connect 416 may include the latest sequence number locally stored by a client computing device, such as client 1 (410). The secondary node receiving the connection request may verify that the sequence number included with the connection request matches the latest sequence number for the logical volume stored by the secondary node receiving the connection request. If the sequence numbers do not match, the secondary node may decline the connection request and refer the client computing device to a membership group authority, such as membership group authority 434, to obtain a latest sequence number for the logical volume. In some embodiments, a secondary node may provide the client computing device with the latest sequence number stored by the secondary node and associated membership group information for the latest sequence number stored by the secondary node.

In some embodiments, a secondary node, in response to receiving a connection request, may send a health check request to a health check application programmatic interface (API) of a node last known to be a primary node for a logical volume that is the subject of the connection request. For example, node 2 (406) sends a health check request 418 to node 1 (404). In some embodiments, the primary node, e.g. node 1 (404), is configured to supply health information to a requesting node in response to receiving a health check request at a health check API. In some embodiments, the health information may include a number of remaining client computing device that are connected to the logical volume via the node that is the subject of the health check request. In some embodiments, the health information may include a number of client computing devices that are associated with the logical volume (e.g. all possible connections whether or not they are currently connected). In some embodiments, the health information may indicate whether a client computing device with a greatest volume of IO traffic directed towards the logical volume remains connected to the primary node that is the subject of the health check request. In some embodiments, the health information may indicate a last time an IO operation was successfully performed by the node that is the subject of the health check request. In some embodiments, the health information may indicate a latest sequence number locally stored by the primary node that is the subject of the health check request. In some embodiments, the health information may indicate whether a rate pause has been invoked, wherein a rate pause is invoked if a number of fail overs for a given volume performed in a given unit of time has exceeded a threshold number of failovers per unit time.

In some embodiments, a secondary node may determine whether or not to initiate a failover based on received health information in response to a health check request. For example, in some embodiments, as long as at least one client computing device remains connected to a primary node, a secondary node may refrain from initiating a transition/failover. In other embodiments, a secondary node may refrain from initiating a transition/failover if a majority of possible connections remain connected to the primary node, and otherwise proceed with initiating a transition/failover. In some embodiments, a secondary node may determine whether or not to initiate a transition/failover based on whether one or more client computing devices with high or highest IO volumes directed to the logical volume remain connected to the primary node. In some embodiments, if no response is received from a primary node within a threshold amount of time of issuing the health check request, the secondary node may assume the primary node is offline or otherwise in bad health and may proceed with initiating a failover. In some embodiments, a transition may include a primary replica and a secondary replica trading roles, such that the primary replica becomes a secondary replica and the secondary replica becomes the primary replica. In some embodiments, a transition may include a failover wherein the secondary replica assumes a role of primary replica, initially with a reduced membership group (e.g. without the previous primary replica in the membership group) and wherein a replacement secondary replica is then added to the membership group.

For example, at 420 secondary node 2 (406) receives an indication that there are no client computing devices remaining connected to logical volume 1 (402) via primary node 1 (404). In response to determining there are no remaining connections, the secondary node 2 (406) determines to initiate a transition/failover for logical volume 1 (402). To initiate the transition/failover, the secondary node 2 (406) increments its locally stored sequence number by "1" and proposes a new sequence number "2" with associated membership group of node 2 (406) as the primary node and node "N" (408) as the secondary node. This is done at 422. Because the proposed sequence number has not been previously authorized for logical volume 1 (402), membership group authority 434 authorizes the proposed sequence number and sends authorization message 424 back to node 2 (406) indicating that the proposed new sequence number of "2" has been authorized. Note that is some embodiments, in response to a health check response indicating no remaining connections, node 2 (406) may initiate a "flip" transition. To do this, node 2 (406) may propose a new incremented sequence number along with membership group information indicating reversed roles for the primary and secondary replica nodes. For example, node 2 (406) may propose sequence number "2" with membership group information 2, 1, indicating that node 2 is to be primary and node 1 is to be secondary.

In response, at 426, node 2 (406) locally stores the new authorized sequence number of "2" and the membership group information associated with sequence number "2." Node 2 (406) also sends, at 428, the new authorized sequence number "2" to other members of the membership group associated with sequence number "2", such as node "N" (408). At 430, node "N" (408) locally stores the new authorized sequence number 2 and associated membership group information. At 432, node 2 (406) indicates to client 1 (410) that the requested connection has been granted and sends client 1 (410) the new authorized sequence number "2" and associated membership group information. The client 1 (410) locally stores the new sequence number "2" and the associated membership group information for sequence number "2."

FIG. 4B shows nodes 1 (404), 2 (406), and "N" (408) with the updated sequence number and associated membership group information, wherein node 1 (404) is no longer the primary node for logical volume 1 (402). Also nodes 2 (406) and "N" (408) have been updated to show sequence number "2" and its associated membership group information (e.g. M.G.=2, N). Note that now node 2 (406) is the primary node for logical volume 1 (402) and there is only one secondary node, node "N", as opposed to two secondary nodes as shown in FIG. 4A. Though, as shown in FIG. 4C the loss of a replica node causes a replacement replica to be configured. While not shown in FIG. 4B, a replacement replica node may have been configured prior to receiving an additional 10, or after receiving an additional 10, such as the write request shown in FIG. 4B.

At 438, client 2 (436) sends IO request 438 to node 1 (404), which was previously the primary node for logical volume 1 (402), but has been superseded by node 2 (406). Node 1 (404) then sends a peer confirmation message 440 to node 2 (406). While not shown, node 1 may also send a peer confirmation message to node "N" (408). At 442, a return message from node 2 (406) indicates that the sequence numbers do not match, e.g. node 2 is on sequence number "2" while client 2 (436) and node 1 (404) are still on sequence number "1." In response, at 444, node 1 declines to perform the requested read.

In some embodiments, node 1 (404) may report the new sequence number "2" and associated group information received from node 2 (406) to client 2 (436). However, in some embodiments, node 1 (404) may simply decline to perform the requested read and client 2 (436) may contact membership group authority 434 to obtain a latest sequence number and associated membership group information for logical volume 1 (402). For example, at 446 client 2 (436) requests the latest sequence number and membership group information for logical volume 1 (402) from membership group authority 434. And, at 448 membership group authority 434 replies with sequence number "2" and its associated membership group information. Client 2 (436) locally stores the new authorized sequence number "2" and its associated membership group information.

At 450, client 2 then requests to connect to node 2 (406), wherein the request includes sequence number "2" (either supplied from node 1 or obtained from the membership group authority 434). In response, node 2 determines that sequence number "2" included with the connection request matches sequence number "2" locally stored by node 2 and at 452 grants the connection request.

At 454, client 2 (436) sends IO request 454 to node 2 (406), node 2 sends peer confirmation message 456 to node "N" (408) and receives confirmation reply 458. Node 2 (406) then performs the requested IO and sends confirmation 460 to client 2 (436).

In some embodiments, if a secondary node is behind a primary node in regard to sequence number, instead of declining to perform a read or write, the secondary node may update its locally stored sequence number in response to receiving a peer confirmation message with a greater sequence number than the sequence number locally stored by the secondary node.

FIG. 4C shows actions taken in response to a replacement secondary node being made available, wherein the replacement secondary node makes up for the failure of node 1 (404) as shown in FIG. 4A.

At 462, primary node 2 (406) request a placement decision from a placement component of block-based storage service control plane 130. In response, at 464, the control plane 130 provides primary node 2 (406) with an indication of a replacement candidate to store a replacement secondary replica for logical volume 1 (402). For example, control plane 130 identifies node N+1 (466) as a replacement candidate to store a replacement replica for logical volume 1 (402).

In response, at 468, node 2 (406) re-mirrors volume data stored for logical volume 1 (402) on node 2 (406) (e.g. the volume data of the primary replica) to the replacement replica candidate node N+1 (466). At 470, node 2 (406) receives an indication that the volume data for volume 1 (402) has been successfully re-mirrored to node N+1 (466), such that node N+1 (466) now stores a secondary replica of logical volume 1 (402).

In response, at 472, primary node 2 (406) proposes a new sequence number "3" and associated membership group information that includes node N+1 (466) as a replacement secondary node to membership group authority 434 and at 474 receives confirmation that sequence number "3" has been authorized and the updated membership group information for sequence number "3" has been stored at the membership group authority 434. In response, at 476, node 2 (406) updates its locally stored sequence number and membership group information to sequence number "3" and the membership group information associated with sequence number "3."

At 478 and 482 primary node 2 (406) sends the new authorized sequence number "3" and associated updated membership group information to other members of the membership group, such as nodes N+1 (466) and "N" (408). At 480, node N (408) locally stores the new authorized sequence number "3" and its associated membership group information. Also, at 484, node "N+1" (466) locally stores the new authorized sequence number "3" and its associated membership group information.

At 486 and 488, node 2 (406) provides the new sequence number "3" and its associated membership group information to connected clients 1 (410) and 2 (436). Alternatively, clients 1 and 2 may be made aware of the new sequence number "3" in response to a declined IO request and/or by requesting a latest sequence number and associated membership group information from membership group authority 434.

FIGS. 5A-5H are diagrams illustrating interactions between nodes that implement a logical volume, a node that implements a membership group authority, and multiple clients attached to the logical volume, wherein a first connection failure does not trigger a transition/failover due to good health of a primary replica node and a second connection failure causes a transition/failover from a primary replica node to a secondary replica node and the enablement of a replacement secondary replica node, according to some embodiments.

FIG. 5A-H illustrates a logical volume implemented via node 1 (506) and node 2 (508) of a block-based storage system. For example, in some embodiments, nodes 1 and 2 may be computing devices of a block-based storage service, such as computing devices 106, 108 or 110 of block-based storage service 104 illustrated in FIGS. 1 and 2. FIG. 5 also illustrates client computing devices attached to the logical volume. The client computing devices include client computing device 1 (502) and client computing device 2 (504). In some embodiments any number of client computing devices may be attached to a logical volume. In some embodiments, client computing devices 1 and 2 may be client computing devices such as client computing devices 136, 138, or 140 as illustrated in FIG. 1 or may be compute instances of a virtual computing service, such as illustrated in FIG. 2. In some embodiments, similar components illustrated in FIGS. 3, FIGS. 4A-4C, and FIG. 5A-5H may perform the actions as illustrated in all of FIG. 3, FIGS. 4A-4C, and FIG. 5A-5H.

Figure 5A:
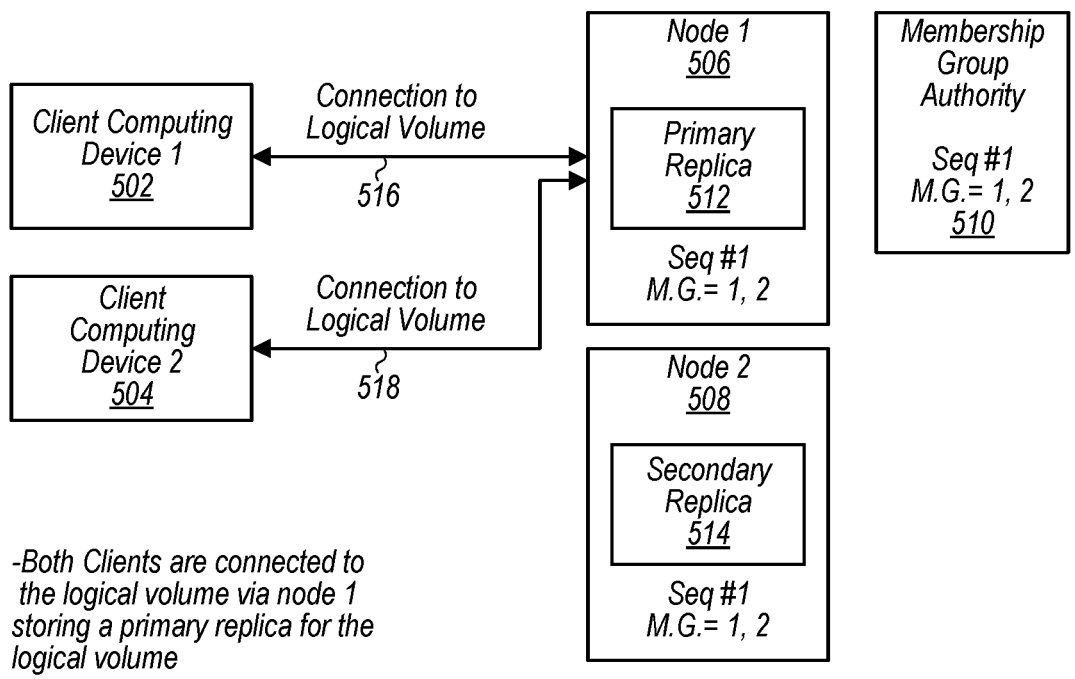
FIGS. 5A-5H are diagrams illustrating interactions between nodes that implement a logical volume, a node that implements a membership group authority, and multiple clients attached to the logical volume, wherein a first connection failure does not trigger a transition due to good health of a primary replica node and a second connection failure causes a fail over from a primary replica node to a secondary replica node and the enablement of a replacement secondary replica node, according to some embodiments.

As shown in FIG. 5A, client computing device 1 (502) may be connected to a logical volume via connection 516 to node 1 (506) storing primary replica 512. Additionally, client computing device 2 (504) may be connected to the logical volume via connection 518 to node 1 (506) storing primary replica 512. Also, node 2 (508) may store secondary replica 514. In some embodiments additional nodes may store additional secondary replicas.

Also, under normal conditions (e.g. no failure or no in progress transition/failover) node 1 (506) and node 2 (508) may be on a same sequence number, e.g. sequence number "1" that corresponds with a latest sequence number for the logical volume stored by membership group authority 510. Each member of the membership group, e.g. node 1 (506) and node 2 (508), may locally store the latest sequence number for the logical volume that has been presented to the respective member of the membership group (e.g. node 1 (506) or node 2 (508), respectively). While not shown, client computing device 1 (502) and client computing device (504) may also locally store sequence number "1" and membership group information associated with sequence number "1."

Figure 5B:
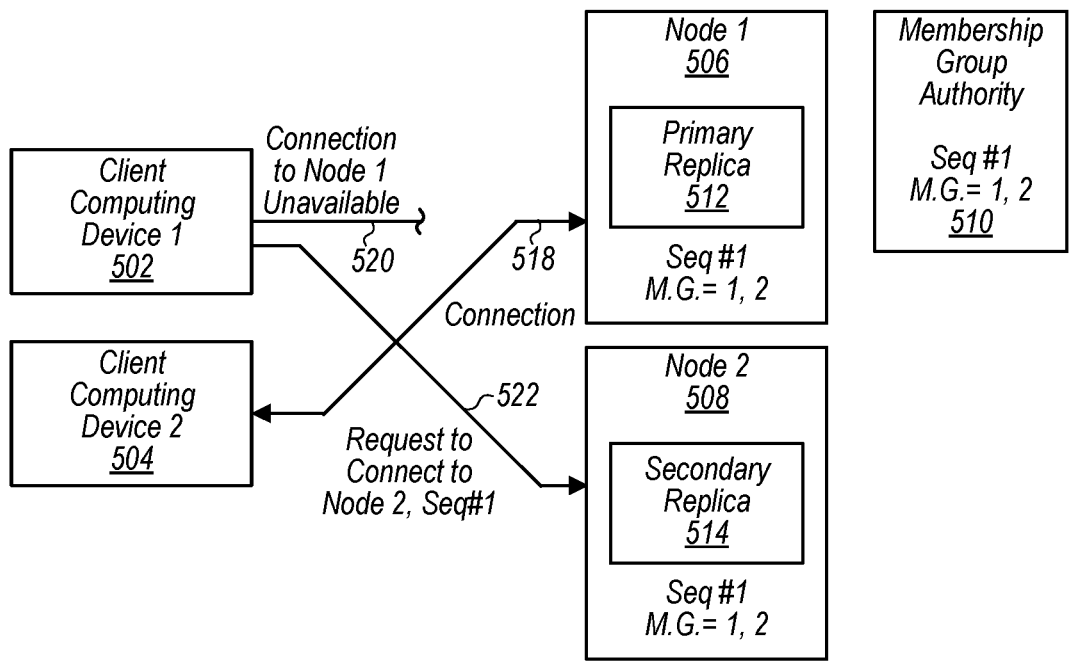

In FIG. 5B a failure or network issue may have caused the connection between client computing device 1 (502) and node 1 (506) to become unavailable (520). However, client computing device 2 (504) may remain connected to node 1 (506) via connection 518.

In response to the loss of connection 520, client computing device 1 (502) may attempt to connect to a secondary node indicated in the membership group information for sequence number "1" that is locally stored by client computing device 1 (502). For example, client computing device 1 (502) sends connection request 522 to node 2 (508), wherein the connection request includes sequence number "1" indicating that sequence number "1" is the latest sequence number stored by client computing device 1 (502). As an initial matter, node 2 (508) may verify that sequence number "1" matches a latest sequence number for the logical volume locally stored by node 2 (508). If the sequence numbers do not match, node 2 (508) may refer client computing device 1 (502) to membership group authority 510 to obtain a latest sequence number for the logical volume, or if node 2 (508) locally stores a later sequence number, node 2 may provide the later sequence number and associated membership group information to client computing device 1 (502).

Figure 5C:
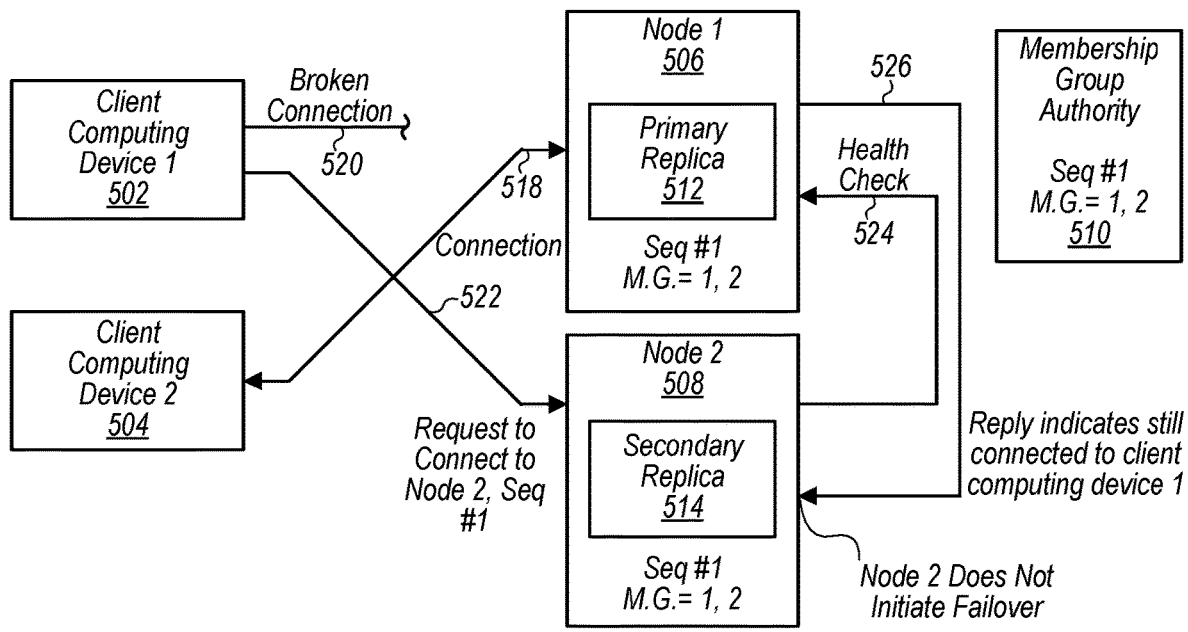

In FIG. 5C, node 2 (508), in response to receiving the request to connect 522 from client computing device 1 (502) determines whether or not to initiate a transition/failover. In order to determine whether or not to initiate a transition/failover, node 2 (508) may send a health check request to a health check API of node 1 (506). For example, node 2 (508) sends health check request 524 to a health check API of node 1 (506) and receives health information for node 1 (506) in a response message 526. As an example, the health information indicates that node 1 (506) remains connected to client computing device 2 (504) via connection 518. Thus, node 2 (508) determines based on the existence of an active connection to node 1 (506) to not proceed with initiating a transition/failover for the logical volume. As discussed above, in some embodiments a secondary node may utilize other criteria to determine whether or not to proceed with initiating a transition/fail over, such as whether a majority of client computing devices remain connected to a primary node, whether the primary node remains connected to a client computing device generating the most IO traffic, etc. In some embodiments, if node 1 (506) returns health information indicating that a problem exists outside of node 1 (e.g. a network problem, as an example), node 2 (508) may determine to initiate a transition to flip roles with node 1, wherein node 2 assumes a role of primary replica and node 1 is demoted to secondary replica. In some embodiments, if node 1 (506) returns health information (or fails to reply) such that it is indicated that a problem is specific to node 1 (e.g. the server implementing node 1 is failed), node 2 (508) may initiate a failover, as opposed to a flip transition.

Figure 5D:
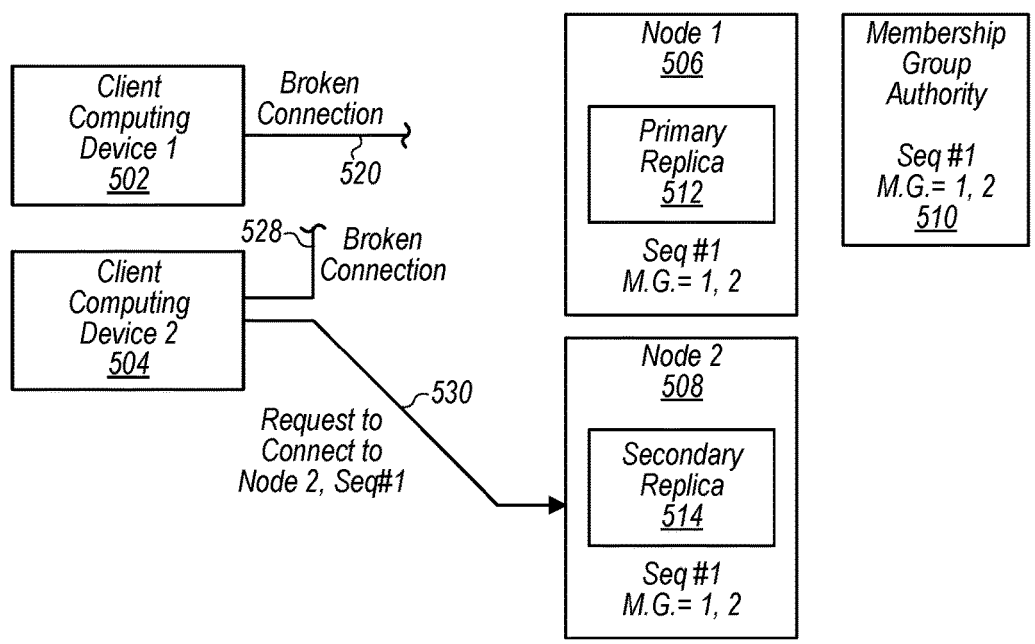

In FIG. 5D, another failure or network issue has caused the connection between client computing device 2 (504) and node 1 (506) to be broken (528) such that there are not any remaining client computing devices connected to the logical volume via node 1 (506). In response to the loss of connection 518 to node 1, client computing device 2 (504) may request to connect to a secondary node for the logical volume as indicated in membership group information locally stored by client computing device 2 (504). For example, client computing device 2 (504) sends connection request 530 to node 2 (508) storing secondary replica 514. The connection request 530 includes sequence number "1" which is the latest sequence number for the logical volume stored by client computing device 2 (504). In response to receiving the connection request, node 2 (508) may verify that sequence number "1" included with connection request 530 matches sequence number "1" that is locally stored by node 2 (508) for the logical volume.

Figure 5E:
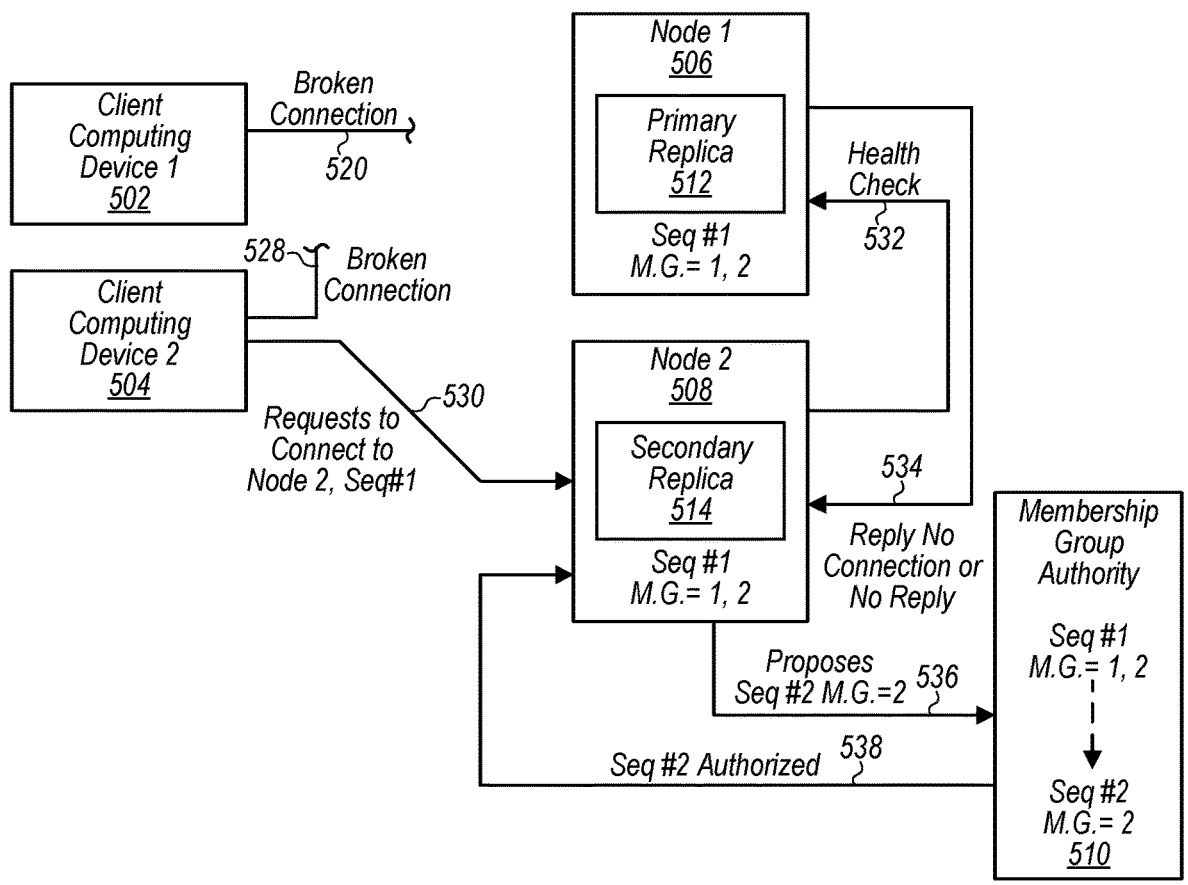

In FIG. 5E node 2 (508), in response to receiving connection request 530, determines whether or not to initiate a transition or failover for the logical volume. In order to determine whether or not to initiate a transition or failover, node 2 (508) sends a health check request 532 to the health check API of node 1 (506). In response, node 1 (506) replies with health information 534 indicating that there are not any remaining connections between node 1 (506) and client computing devices attached to the logical volume. Alternatively, if the broken connections are due to a failure of node 1 (506), there may be no reply received in response to the health check request 532. Based on not receiving a reply or receiving health information indicating no remaining connections, node 2 (508) determines to proceed with initiating a transition or failover for the logical volume.

To initiate a failover, at 536 node 2 (508) propose a new sequence number "2" to membership group authority 510 along with associated membership group information indicating node 2 (508) will be a solo primary for the logical volume. As sequence number "2" is the next number in the sequence (e.g. is 1 greater than the previous latest sequence number) and has not already been authorized for the logical volume, membership group authority 510 authorizes sequence number "2" and sends authorization message 528 back to node 2 (508). To initiate a flip transition (not shown) node 2 (508) would propose a new sequence number "2" to membership group authority 510 along with associated membership group information indicating that node 2 (508) will be a primary and node 1 (506) will be a secondary for the logical volume.

Figure 5F:
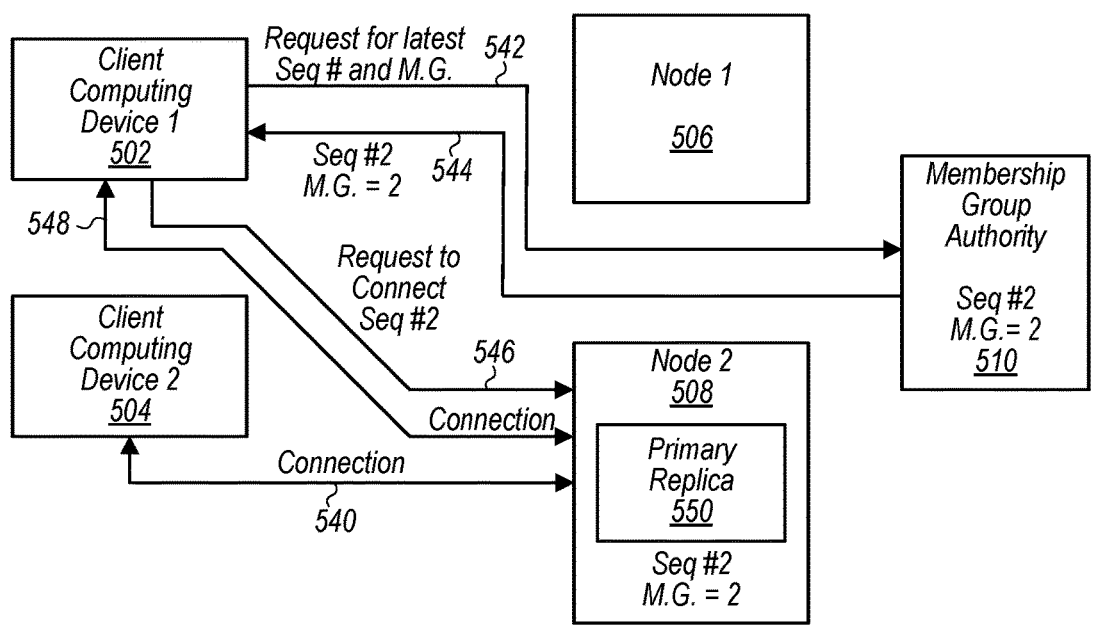

In FIG. 5F, node 2 (508) now stores primary replica 550 for the logical volume and establishes connection 540 between node 2 (508), now acting as a primary node for the logical volume, and client computing device 2 (504).

Additionally, client computing device 1 (502) queries (542) membership group authority 510 for a latest sequence number and membership group information for the logical volume. In response membership group authority 510 sends reply 544 indicating sequence number "2" is the latest sequence number for the logical volume and node 2 (508) is a solo primary node for the logical volume.

Client computing device 1 (502) then sends a connection request 546 to node 2 (as it is indicated in the latest membership group information as storing the primary replica for the logical volume). The connection request 546 includes sequence number "2" as the latest sequence number locally stored by client computing device 1 (502). Node 2 (508) determines that this sequence number matches the latest sequence number locally stored by node 2 (508), and since node 2 (508) is a now a primary node for the logical volume, node 2 (508) accepts the connection request and establishes connection 548 between node 2 (508) and client computing device 1 (502).

Figure 5G:
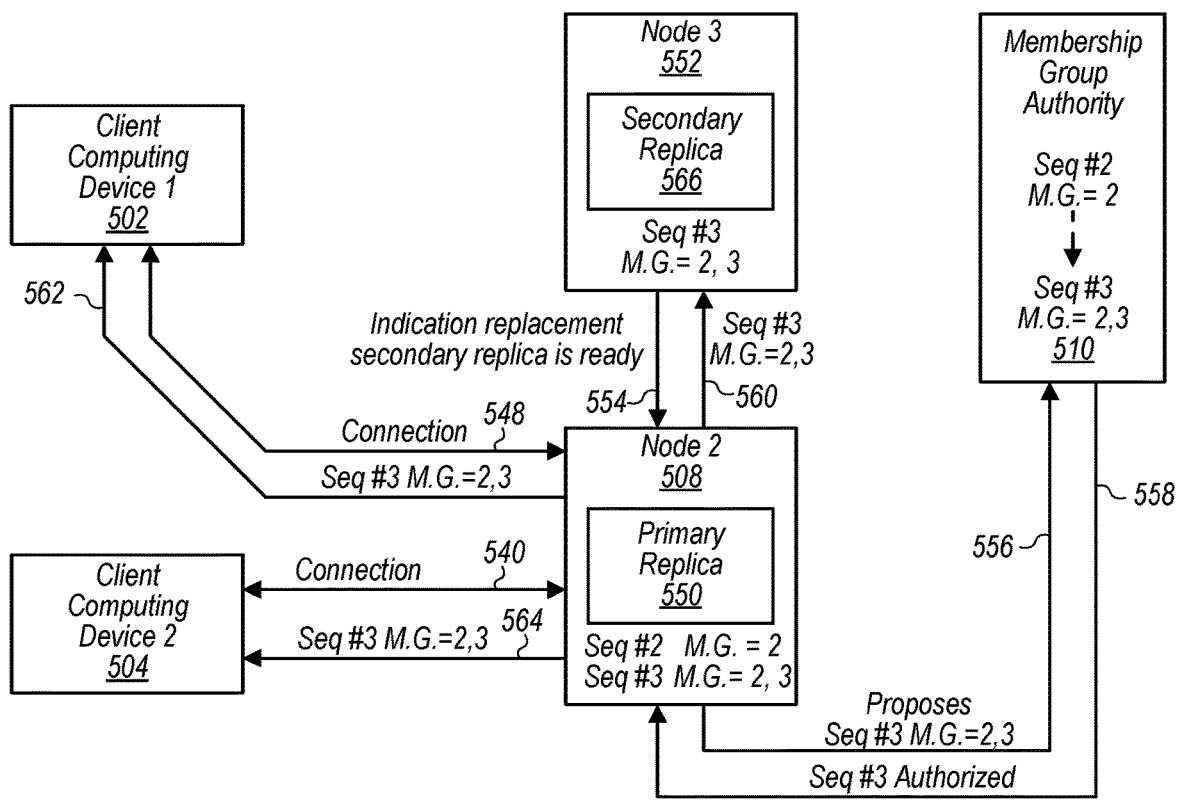

FIG. 5G illustrates a secondary replacement replica being established for the logical volume. For example node 3 (552) has been designated to store secondary replica 566 which replaces the secondary replica 514 that was stored on node 2 (508) and converted into primary replica 550.

Node 3 (552), or a control plane of the block-based storage service, sends a notification 554 to node 2 (508) now storing primary replica 550, that secondary replica 566 stored on node 3 (552) is ready to be put in service and start accepting replicated writes. In response, node 2 (508) proposes (556) a new sequence number "3" to membership group authority 510 and associated membership group information indicating that node 2 (508) stores a primary replica for the logical volume and node 3 (552) stores a secondary replica for the logical volume. Because the proposed sequence number is the next sequence number in sequence and has not already been authorized for the logical volume, membership group authority 510 authorizes sequence number "3" and sends authorization message 558 back to node 2 (508).

Node 2 (508), then provides the new authorized sequence number "3" and associated membership group information to other members of the membership group. For example, at 560 node 2 (508) provides sequence number "3" and related membership group information to node 3 (552).

Also at 562 and 564, node 2 (508) provides the new updated sequence number "3" and associated membership group information to connected client computing devices 1 (502) and 2 (504). Alternatively, node 2 (508) may drop the existing connections 540 and 548, which would cause client computing device 1 (502) and client computing device 2 (504) to seek updated sequence numbers and associated membership group information from membership group authority 510. Client computing device 1 (502) and client computing device 2 (504) may retry connections to node 2 (508) with the updated sequence number "3" and be reconnected to node 2 (508).

Figure 5H:
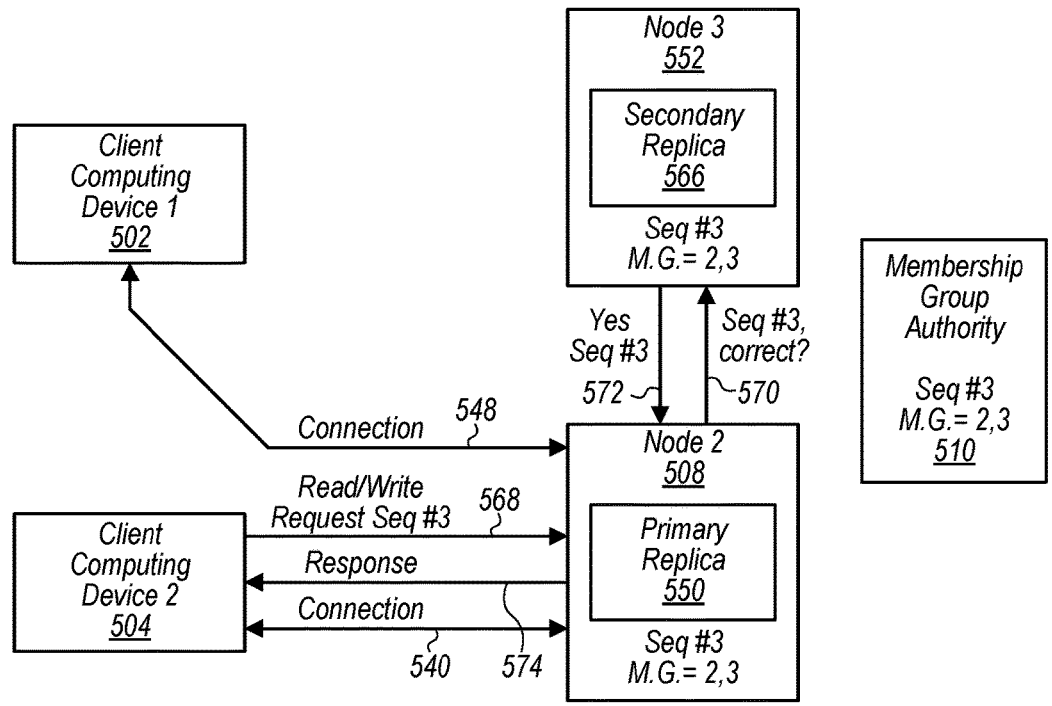

In FIG. 5H client computing device 2 (504) sends a read or write request 568 to connected primary node 2 (508). In response node 2 (508) sends peer confirmation message 570 to node 3 (552) to verify that node 3 is also on sequence number "3", which matches the latest sequence number locally stored by node 2 (508). In response node 3 (552) sends a peer confirmation message 572 confirming that node 3 (552) is also on sequence number "3." After verifying that all members of the membership group are on the same sequence number, node 2 (508) replies to the read request at 574.

FIGS. 6A-6E are diagrams illustrating interactions between nodes that implement a logical volume, a node that implements a membership group authority, and multiple clients attached to the logical volume, wherein different clients drive different nodes to assume a role of primary replica node and a membership group authority avoids unnecessary fail overs due to the computing nodes, according to various embodiments.

FIG. 6 illustrates a logical volume implemented via node 1 (608), node 2 (610), and node 3 (612) of a block-based storage system. For example, in some embodiments, nodes 1, 2, and 3 may be computing devices of a block-based storage service, such as computing devices 106, 108 and 110 of block-based storage service 104 illustrated in FIGS. 1 and 2. FIG. 6 also illustrates client computing devices attached to the logical volume. The client computing devices include client computing device 1 (602), client computing device 2 (604), and client computing device 3 (606). In some embodiments any number of client computing devices may be attached to a logical volume. In some embodiments, client computing devices 1, 2, and 3 may be client computing devices such as client computing devices 136, 138, and 140 as illustrated in FIG. 1 or may be compute instances of a virtual computing service, such as illustrated in FIG. 2. In some embodiments, similar components illustrated in FIGS. 3, FIGS. 4A-4C, FIGS. 5A-5H, and FIGS. 6A-6E may perform the actions as illustrated in all of FIG. 3, FIGS. 4A-4C, FIGS. 5A-5H, and FIGS. 6A-6E.

Figure 6A:
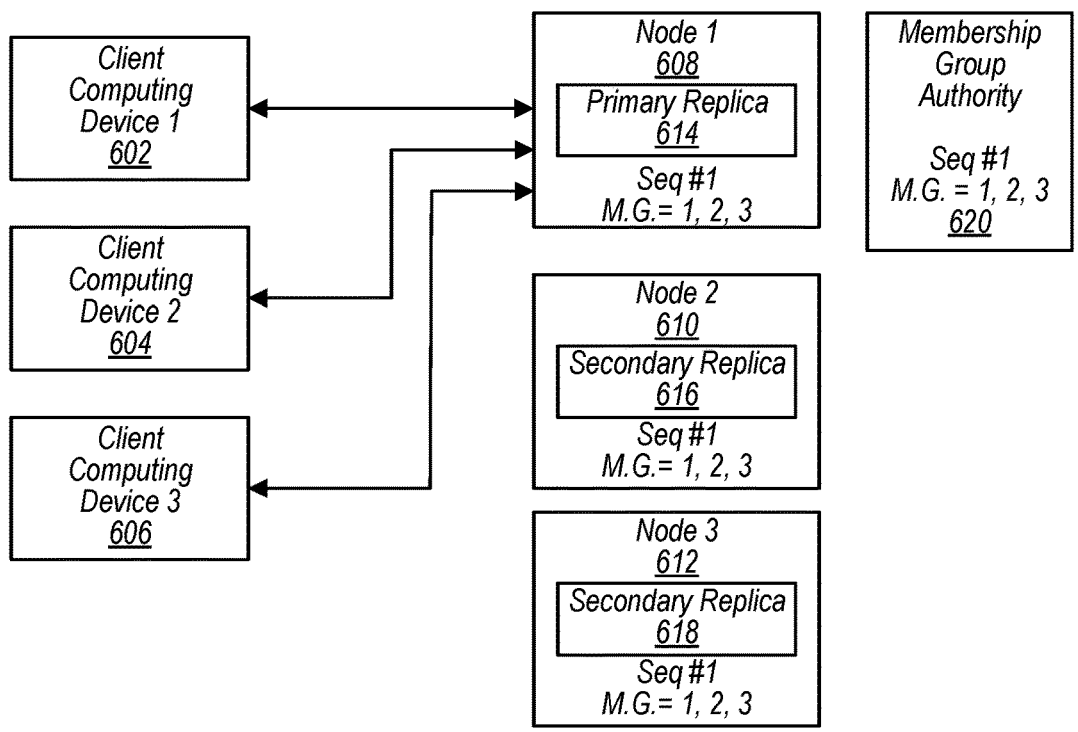
FIGS. 6A-6E are diagrams illustrating interactions between nodes that implement a logical volume, a node that implements a membership group authority, and multiple clients attached to the logical volume, wherein different clients drive different nodes to assume a role of primary replica node and a membership group authority avoids unnecessary fail overs due to the different clients driving different nodes to assume the role of primary replica node, according to various embodiments.

In FIG. 6A, client computing device 1 (602), client computing device 2 (604), and client computing device (606) are all connected to a logical volume via node 1 (608) storing primary replica 614. Additionally, node 2 (610) stores secondary replica 616 and node 3 (612) stores secondary replica 618. Nodes 1 (608), 2 (610), and 3 (612) all locally store sequence number "1" and membership group information indicating node 1 is a primary node and nodes 2 and 3 are secondary nodes. Additionally, membership group authority 620 stores sequence number "1" as a latest sequence number for the logical volume and stores associated membership group information indicating that node 1 is a primary node for the logical volume and nodes 2 and 3 are secondary nodes for the logical volume.

Figure 6B:
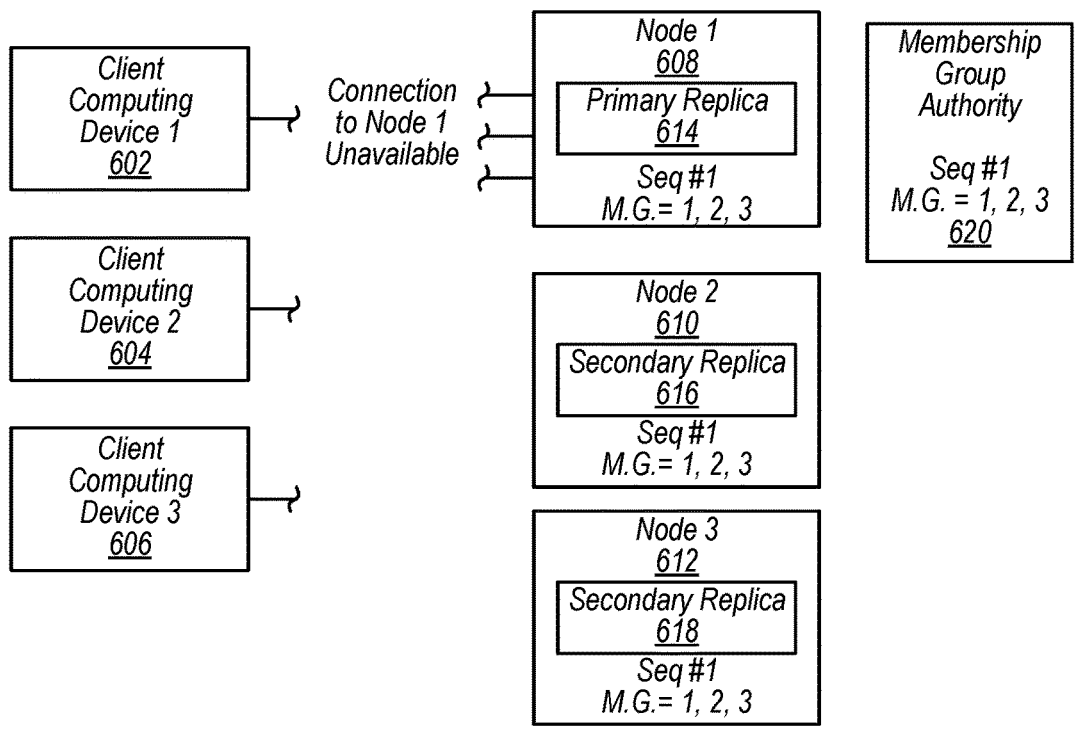

In FIG. 6B a failure or network issue has caused client computing devices 1 (602), 2 (604), and 3 (606) to lose their respective connections to node 1 (608).

Figure 6C:
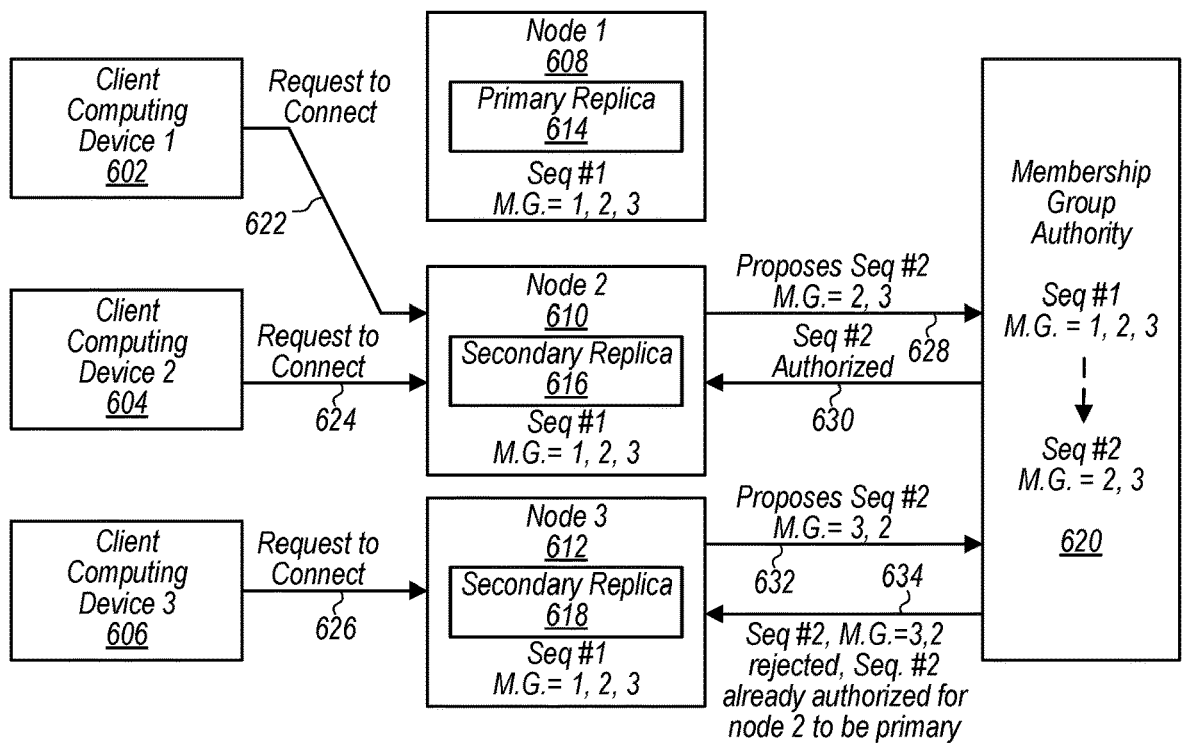

In FIG. 6C client computing devices 1 (602) and 2 (604) both try to connect to node 2 (610) by sending connection requests 622 and 624 to node 2 (610). However, client computing device 3 (606) tries to connect to node 3 (612) by sending connection request 626. In some situations different client computing devices may send connection requests to different secondary nodes due to network issues. For example, a network partition caused by a networking failure may partition client computing devices 1 (602) and 2 (604) along with node 2 (610) on one side of a network partition and client computing device 3 (606) and node 3 (612) on the other side of the network partition.

In some circumstances, the fact that different client computing devices have tried to connect to different secondary nodes may set up a race between the secondary nodes to see which secondary node can become primary. However, as discussed below, the fact that a block-based storage system requires a node requesting a new sequence number to present an incremented sequence number that is one greater than a locally stored sequence number to a membership group authority that only authorizes sequence numbers that have not yet been authorized, may prevent a scenario wherein the racing nodes drive excessive flip-flops between primary and secondary. For example, both nodes will be proposing a sequence number of "2", such that the first node to win the race to the membership group authority will be authorized for sequence number "2." The second place node in the race will not be authorized for sequence number "2" because it will have already been taken. Furthermore, the second place node will not propose sequence number "3" because it has not yet received sequence number "2" from the node that won the race.

For example, at 628 node 2 (610) proposes sequence number "2" with membership group information indicating node 2 is primary and node 3 is secondary to membership group authority 620. Because node 2 (610) is the first to the membership group authority such that membership group authority 620 has not already authorized sequence number "2," the membership group authority authorizes sequence number "2" to node 2 (610) and stores membership group information indicating that node 2 (610) is primary and node 3 (612) is secondary. Membership group authority 620 sends authorization message 630 to node 2 (610) indicating that sequence number "2" has been authorized for node 2 (610) to be primary node.

At 632, node 3's proposal for sequence number "2" and associated membership group information indicating node 3 (612) as primary and node 2 (610) as secondary arrives to membership group authority 620 after node 2's proposal for sequence number "2." Since sequence number "2" has already been authorized, membership group authority 620 declines to authorize sequence number "2" to node 3 (612) with node 3 as primary.

Figure 6D:
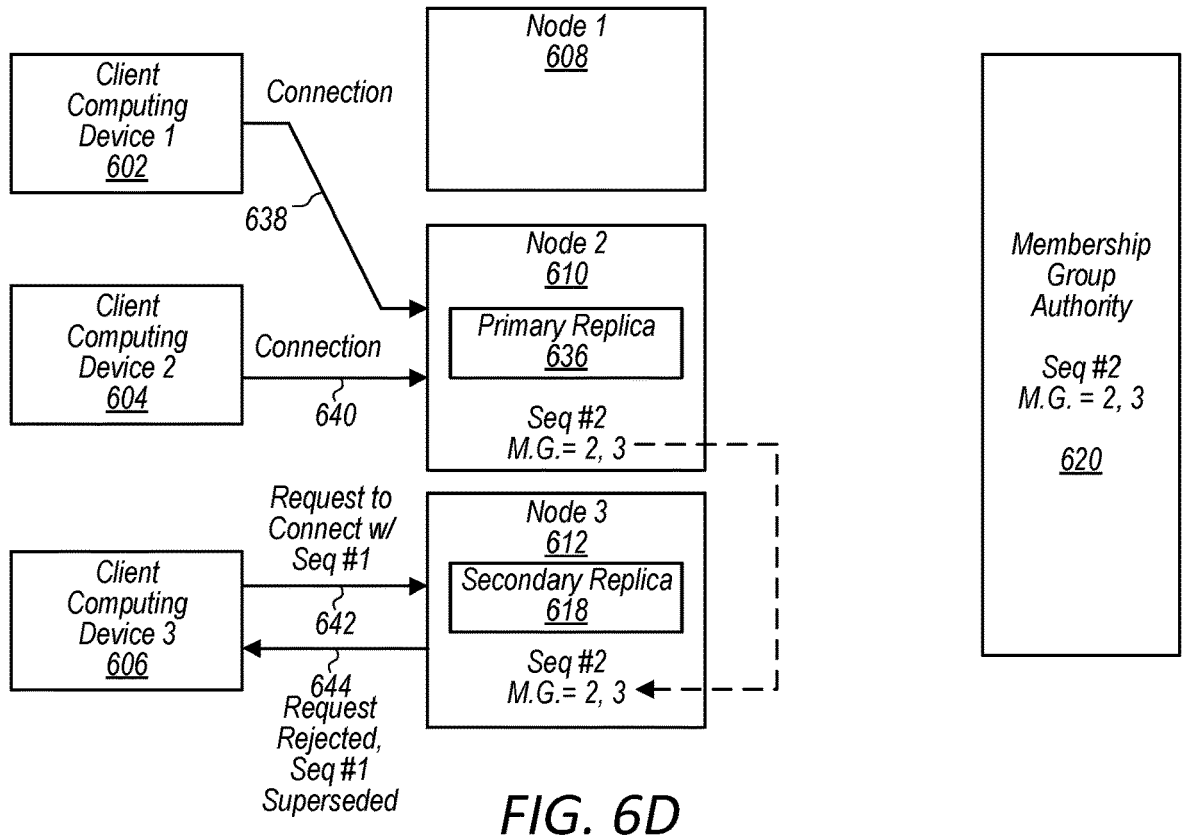

In FIG. 6D, node 2 (610) assumes the role of primary node storing primary replica 636 (where node 2 previously stored secondary replica 616). Node 2 (610) also provides the updated latest sequence number and membership group information to other members of the membership group, such as node 3 (612). Additionally, node 2 (610) establishes connections 638 and 640 between client computing devices 1 (602) and 2 (604) and node 2 (610), respectively.

In some embodiments, client computing device 3 (606) may retry a connection (642) with node 3 (612). Note that client computing device 3 (606) is still on sequence number "1" because its request 626 to connect to node 3 drive node 3 to propose sequence number "2" at 632, but the request was rejected because sequence number "2" was already authorized. In some embodiments, node 3 (612) may provide an updated sequence number and associated membership group information in a connection rejected message 644. The requesting client computing device, such as client computing device 3 (606) may then retry the connected another time with the provided updated sequence number and direct the request to a primary node as indicated in updated membership group information to establish a connection to a newly promoted primary node.

In some embodiments, a client computing device, such as client computing device 3 (606) may additionally or alternatively request an updated sequence number and associated membership group information from a membership group authority in response to a rejected connection request.

Figure 6E:
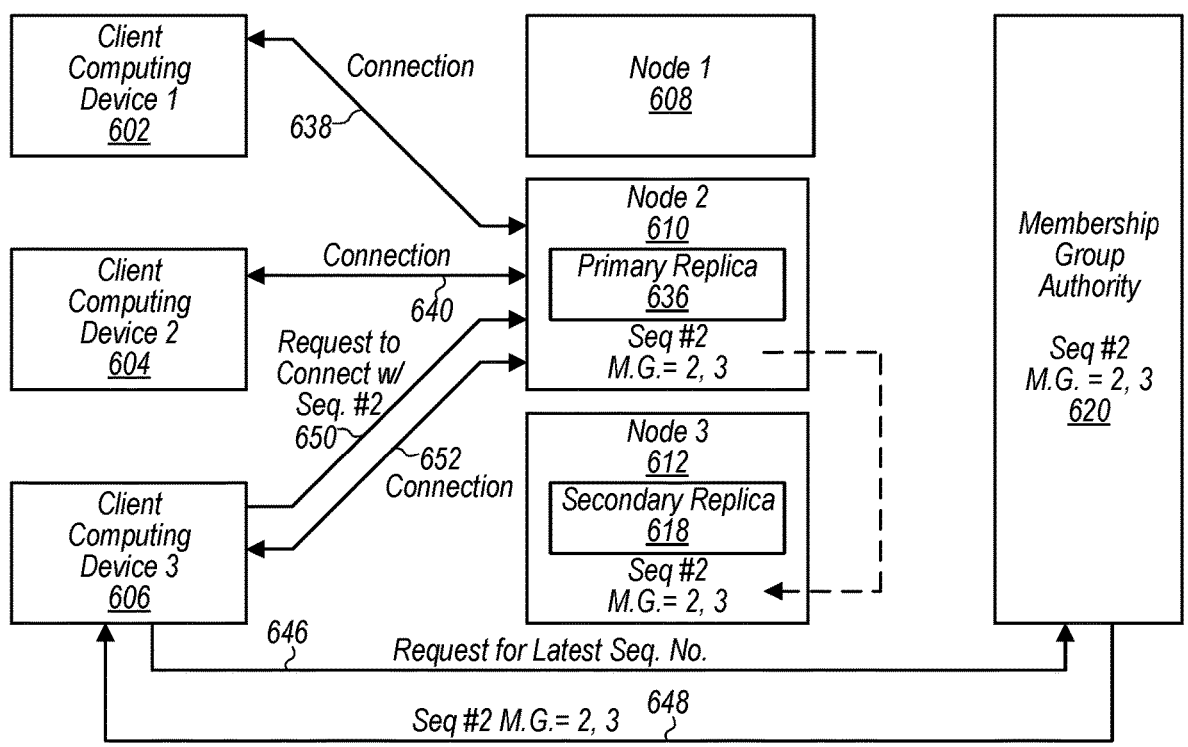

In FIG. 6E, client computing device 3 (606) may query (646) membership group authority 620 for the latest sequence number for the logical volume and associated membership group information. In response membership group authority 620 may provide (648) authorized sequence number "2" with membership group information indicating node 2 is the primary node and node 3 is the secondary node. Client computing device 606 may then request to connect to node 2 (610) via connect request 650 that includes sequence number "2." If successful, connection 652 may be established. In some embodiments, wherein node 3 (612) provides updated membership group information and a latest sequence number with a rejected connection request (e.g. 644), querying the membership group authority (e.g. 646 and 648) may be omitted.

However, if a network partition still prohibits client computing device 3 (606) from communicating with node 2 (610), client computing device 606 may request to connect to node 3 (612). However, node 3 will perform a health check to a health check API of node 2 and upon determining that node 2 is connected to client computing device 1 (602) and client computing device 2 (604), decline to proceed with initiating a transition/failover FIG. 7 is a diagrams illustrating interactions between nodes that implement a logical volume, a node that implements a membership group authority, and multiple clients attached to the logical volume, wherein a node storing a secondary replica fails and a replacement secondary replica node is enabled for the logical volume, according to some embodiments.

Figure 7:
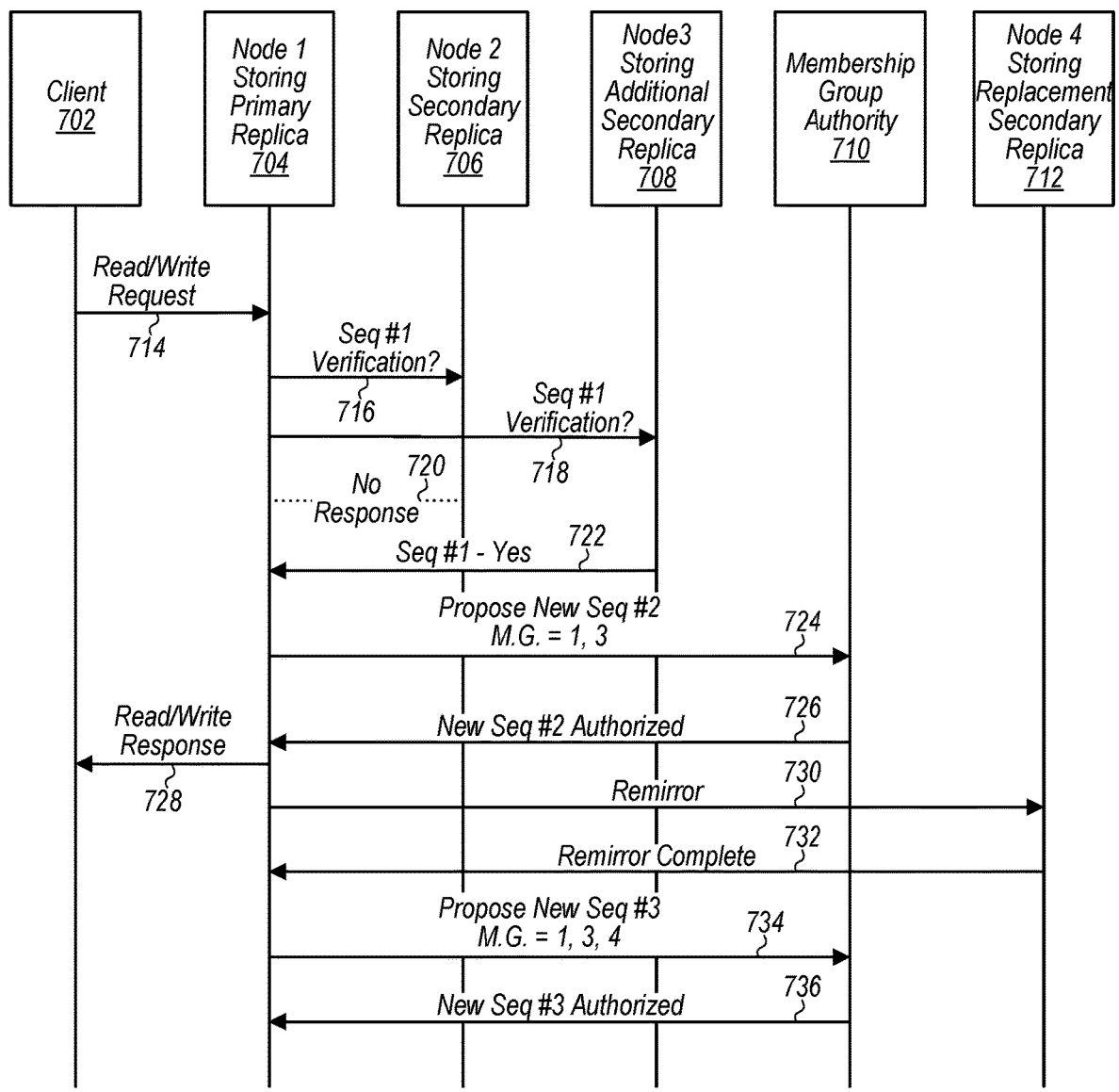
FIG. 7 is a diagram illustrating interactions between nodes that implement a logical volume, a node that implements a membership group authority, and multiple clients attached to the logical volume, wherein a node storing a secondary replica fails and a replacement secondary replica node is enabled for the logical volume, according to some embodiments.

FIG. 7 illustrates a logical volume implemented via node 1 (704), node 2 (706), and node 3 (708) of a block-based storage system. Additionally node 4 (712) stores a replacement secondary replica for the logical volume. For example, in some embodiments, nodes 1, 2, 3, and 4 may be computing devices of a block-based storage service, such as any of computing devices 106, 108 and 110 of block-based storage service 104 illustrated in FIGS. 1 and 2. FIG. 7 also illustrates a client computing device 702 attached to the logical volume. In some embodiments any number of client computing devices may be attached to a logical volume. In some embodiments, client computing device 702 may be a client computing device such as any of client computing devices 136, 138, or 140 as illustrated in FIG. 1 or may be compute instances of a virtual computing service, such as illustrated in FIG. 2. In some embodiments, similar components illustrated in FIGS. 3, FIGS. 4A-4C, FIG. 5A-5H, FIGS. 6A-6E, FIG. 7 may perform the actions as illustrated in all of FIG. 3, FIGS. 4A-4C, FIGS. 5A-5H, and FIGS. 6A-6E, FIG. 7.

At 714 client 702 sends a read or write request to primary node 704. Primary node 704 sends peer confirmation messages 716 and 718 to secondary nodes 706 and 708. Primary node 704 receives a confirmation message 722 from secondary node 708 indicating matching sequence numbers, but receives no reply (720) for secondary node 706 and a verification confirmation reply (722) from node 3 (708) Thus, it is determined that secondary node 706 is unavailable or failed. In response primary node 704 proposes new sequence number 2 (724) to membership group authority 710 along with membership group information leaving unresponsive node 2 out of the membership group. Membership group authority 710 authorizes sequence number 2 and sends authorization message 726 to primary node 704.

At 728, primary node responds to client 702 either confirming the write or providing the read data along with new sequence number "2".

At 730, primary node 704 re-mirrors the primary replica to node 4 (712) that is being configured to store a replacement secondary replica for the logical volume. At 732, node 4 (712) indicates that the re-mirroring has been completed. In response, at 734, primary node 704 proposes a new sequence number "3" to the membership group authority 710 along with membership group information indicating node 1 (704) stores a primary replica for the logical volume and nodes 3 (708) and 4 (712) store secondary replicas for the logical volume. At 736 the membership group authority send an authorization message indicating that sequence number "3" has been authorized for node 1 (704) to function as primary and nodes 3 (708) and 4 (712) to function as secondary nodes.

Figure 8A:
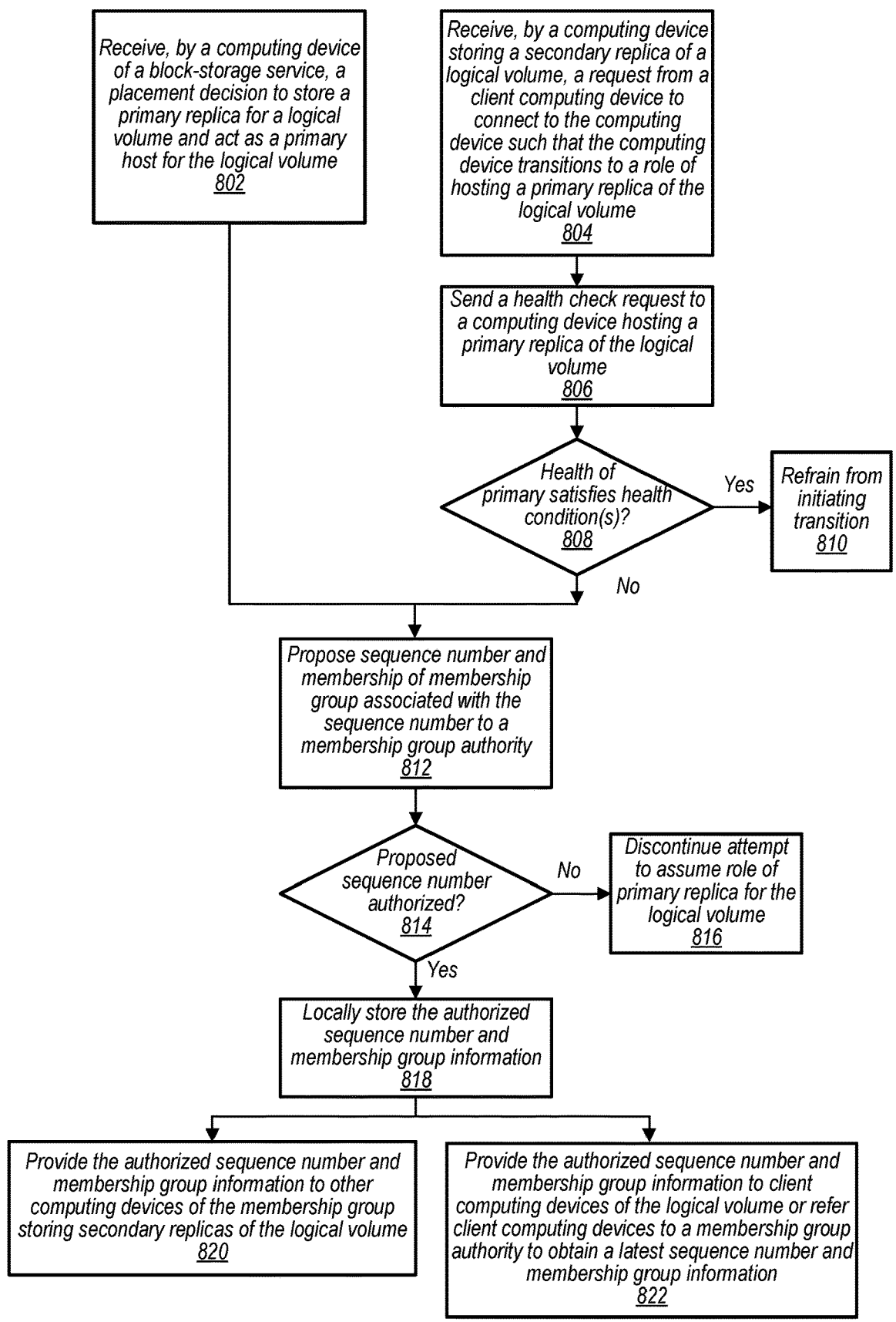
FIG. 8A is a flow diagram illustrating the authorization of sequence numbers for computing devices hosting replicas of a logical volume, according to some embodiments.

FIG. 8A is a flow diagram illustrating the authorization of sequence numbers for computing devices hosting replicas of a logical volume, according to some embodiments.

At 802, a computing device of a block-based storage service, such as a resource host, receives a placement decision from a control plane of the block-based storage service indicating that the computing device is to host a primary replica for a logical volume. Initially the logical volume may be hosted by a single primary node (e.g. the computing device indicated in the placement decision) and an initial sequence number of "0" may be assigned for the logical volume with an associated membership group comprising the single primary node.

As another route to hosting a primary replica, at 804, a computing device of a block-based storage service which is currently hosting a secondary replica for a logical volume may receive a request from a client computing device to connect to the logical volume via the computing device hosting the secondary replica of the logical volume.

At 806, the computing device hosting the secondary replica sends a health check request to another computing device of the block-based storage system hosting or last known to host a primary replica for the logical volume. The computing device hosting the secondary replica locally stores a latest sequence number for the logical volume and associated membership group information. The computing device hosting the secondary replica sends the health check request to the computing device identified in the locally stored membership group information as hosting the primary replica for the logical volume.

At 808, the computing device hosting the secondary replica determines, based on provided health information received in response to the health check request sent at 806, whether the health of the computing device hosting the primary replica for the logical volume satisfies one or more conditions. For example, in some embodiments a condition may be that if at least one client computing device remains connected with an active connection to the computing device hosting the primary replica, then the computing device hosting the secondary replica refrains from initiating a transition/failover. In some embodiments, a condition may be that a computing device storing a secondary replica refrains from initiating a transition/failover if a majority of client computing devices remain connected with active connections to the computing device hosting the primary replica. In some embodiments, if a connection to a client computing device generating a greater IO load than other client computing devices remains connected to the computing device hosting the primary replica, the computing device hosting the secondary replica may refrain from initiating a transition/failover.

At 810, if the health of the computing device hosting the primary replica satisfies the one or more conditions, e.g. is determined to have good health, the secondary computing device refrains from initiating a transition/failover.

At 812, in response to a new placement decision, or in response to a decision to initiate a transition/failover, a computing device to become a primary node for a logical volume proposes to a membership group authority a new sequence number. For example, a computing device of a block-based storage system (e.g. a node) receiving an initial placement such that the computing device stores a primary replica for a logical volume (e.g. primary node) may propose a sequence number of "0" and associated membership group information indicating that the computing device is a sole member of a membership group associated with sequence number "0." Also, a secondary node attempting to assume a role of primary node may propose a sequence number that is greater than a locally stored sequence number by "1." For example, a secondary node locally storing a sequence number of "1" may propose a new sequence number of "2" along with associated membership group information indicating that the secondary node will become the primary node for the logical volume.

In some embodiments, the addition of a new client computing device being connected to a logical volume may trigger an updated membership group and sequence number to be authorized and distributed to members of a membership group. For example, for an initial placement and first connection, a new sequence number and associated membership group information may be authorized. However, in some embodiments, if a client connects to a primary replica that is already connected to another client, the current sequence number and membership group information locally stored by the primary node may be provided to the other client connecting to the primary node without the sequence number being incremented and without requesting a new authorization from a membership group authority.

At 814, the membership group authority indicates to the computing device of the block-based storage system (e.g. node) whether or not the proposed sequence number has been authorized. In some embodiments, if the proposed sequence number is a next sequence number in a sequence and has not already been authorized, the membership group authority will authorize the proposed sequence number.

At 816, in response to being informed that the proposed sequence number has not been authorized, the computing device (e.g. node) attempting to assume a role of primary node for the logical volume abandons or discontinues the attempt to assume the role of primary node for the logical volume.

Conversely, at 818, in response to receiving an indication that the proposed sequence number has been authorized, the computing device attempting to assume the role of primary node locally stores the authorized proposed sequence number and assumes the role of primary node for the logical volume. To do this, at 820, the computing device (now primary node) provides the new authorized sequence number and associated membership group information to other computing devices of the updated membership group. This causes the other members of the updated membership group to recognize the computing device (now primary node) as the primary node for the logical volume. Also, at 822, the computing device (now primary node) provides the authorized new sequence number and associated updated membership group information to client computing devices of the logical volume.

Alternatively or additionally, other nodes of the block-based storage service may refer the client computing devices to the membership group authority to obtain a latest sequence number and associated updated membership group information. For example, if a client computing device attempts to send an IO request to a previous primary node that has been superseded by the computing device (now primary node), the previous primary node will not be able to pass a peer confirmation (e.g. verification of matching sequence numbers) in response to the IO because the previous secondary node that has now been promoted to primary node stores a later sequence number, such that the sequence numbers will not match during the peer confirmation. This may cause the previous primary node that has been superseded to decline to perform the IO and refer the client computing device to the membership group authority to obtain a latest sequence number and associated updated membership group information for the logical volume. As another alternative, the previous primary node that has been superseded may provide the latest sequence number received during the peer confirmation to the client computing device, such that the client computing device can then attempt to connect to the computing device that has been promoted to be a primary node for the logical volume.

Figure 8B:
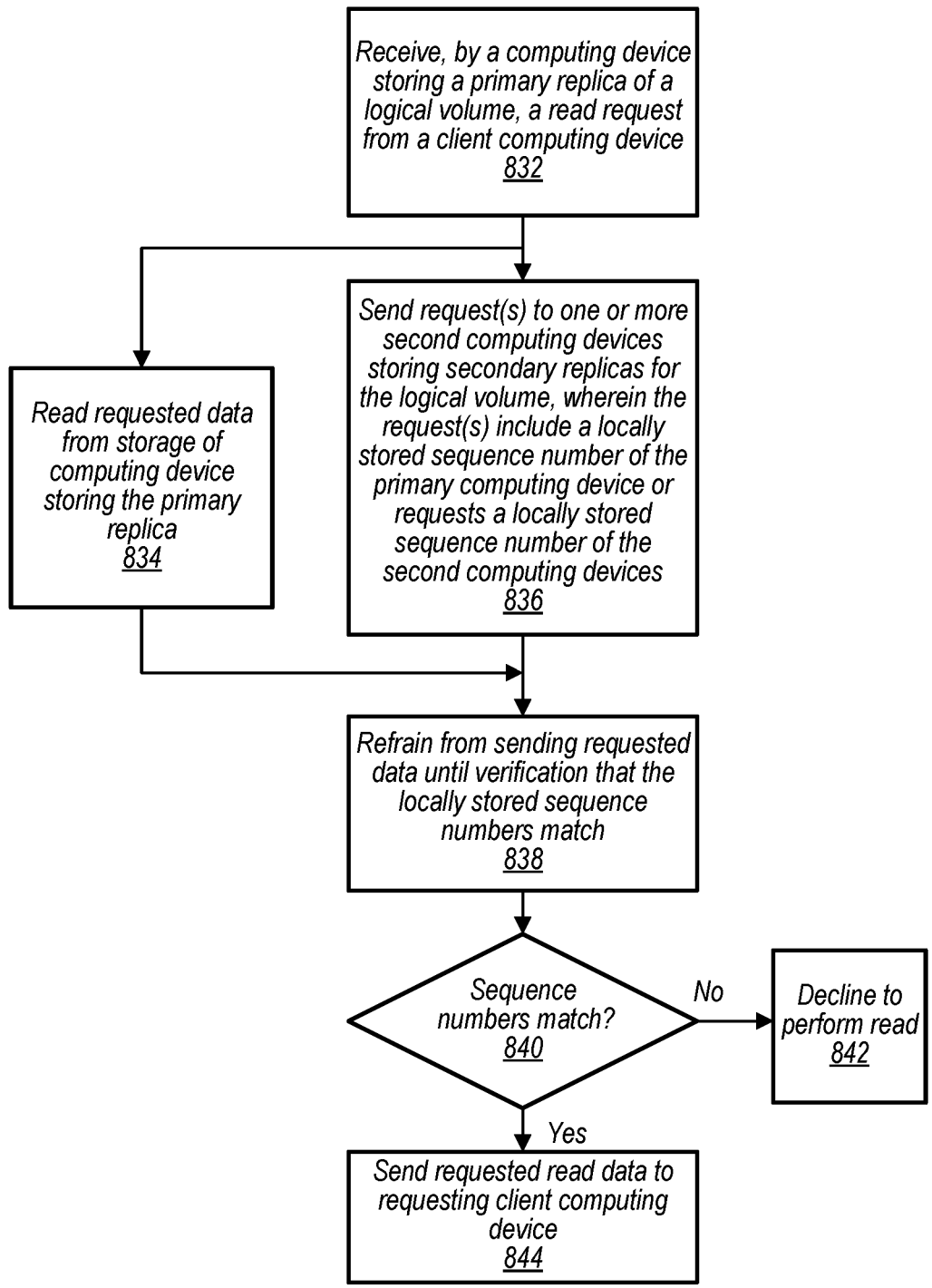
FIG. 8B is a flow diagram illustrating the use of sequence numbers by computing devices hosting replicas of a logical volume when responding to a read request, according to some embodiments.

FIG. 8B is a flow diagram illustrating the use of sequence numbers by computing devices hosting replicas of a logical volume when responding to a read request, according to some embodiments.

At 832, a computing device of a block-based storage service storing a primary replica (e.g. a primary node) receives a read request from a client computing device connected to the primary node.

At 836, the primary node may send one or more peer confirmation messages to other members of a membership group associated with the sequence number locally stored by the primary node. In some embodiments, the primary node may compare its locally stored sequence number to sequence numbers returned from other members of the membership group. Alternatively, in some embodiments, a primary node may provide its latest sequence number to other members of the membership group and request confirmation from the other members that their locally stored sequence numbers match the sequence number locally stored by the primary node.

In parallel with sending the peer confirmation messages at 836, at 834 the primary node may read the requested read data from a local storage of the primary node. For example, the primary node may not wait to receive confirmation messages from peer members of the membership group before reading the requested read data from a local storage of the primary node. This may reduce latency as the latency of the read request will be dictated by the longest one of the two tasks of confirming matching sequence numbers with peers and reading the requested data. In some embodiments, the latency for a read may not be the sum of the time required to obtain peer confirmation and read the requested read data as these tasks are performed at least partially in parallel.

At 838, the primary node refrains from sending the requested read data to the requesting client computing device until confirmation is obtained that the peer members of the membership group that locally stored sequence numbers match the sequence number locally stored by the primary node.

At 840, it is determined whether the peers locally store matching sequence numbers. If the peers do not locally store matching sequence numbers as the sequence number locally stored by the primary node, at 842 the primary node sends a message to the requesting client computing device that the read request has been declined.

At 844, in response to determining that the peer members of the membership group locally store matching sequence numbers as the primary node and as included with the read request, the primary node sends the requested read data to the client computing device requesting the read. In some embodiments, a primary node may require confirmation from all peer nodes of a membership group that all the peer nodes store a same matching sequence number as the primary node before sending the requested read data. This may prevent a stale read, wherein a node performing a read has been superseded.

Figure 8C:
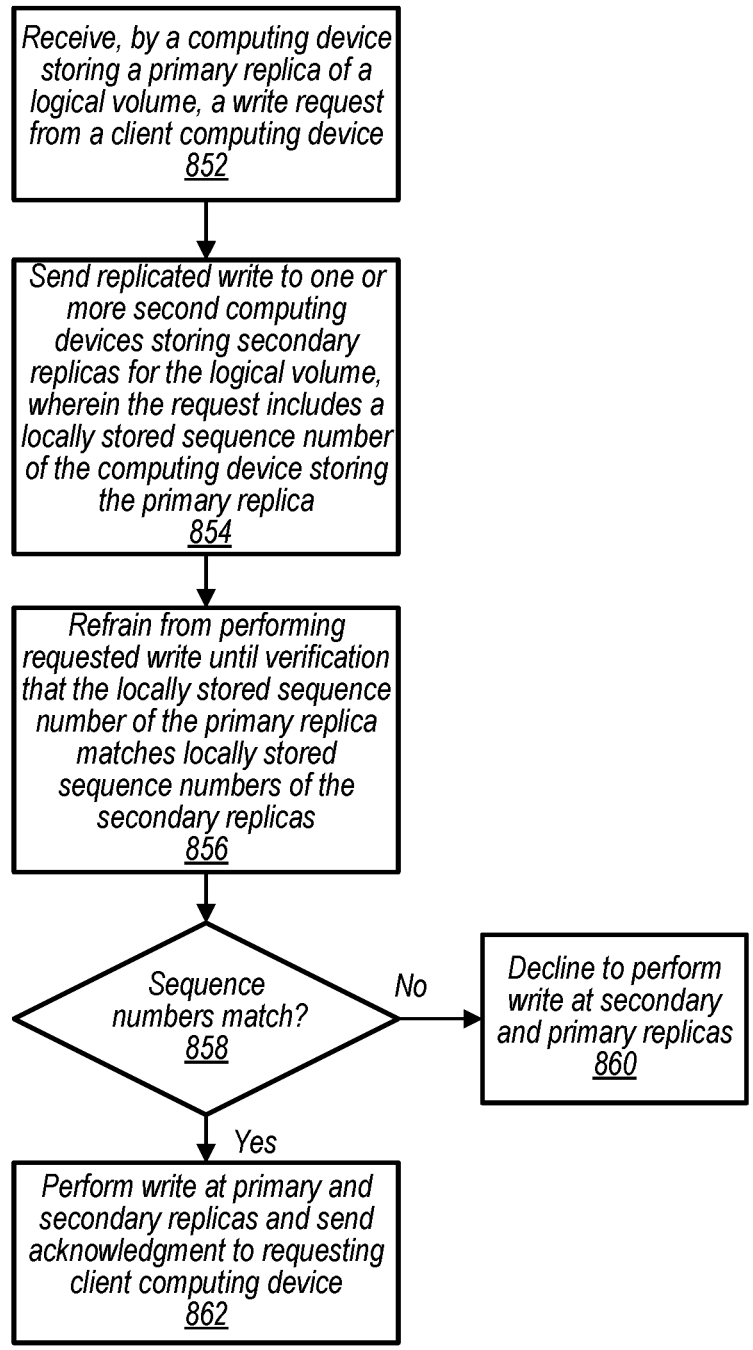
FIG. 8C is a flow diagram illustrating the use of sequence numbers by computing devices hosting replicas of a logical volume when responding to a write request, according to some embodiments.

FIG. 8C is a flow diagram illustrating the use of sequence numbers by computing devices hosting replicas of a logical volume when responding to a write request, according to some embodiments.

At 852, a computing device of a block-based storage service storing a primary replica (e.g. a primary node) receives a write request from a client computing device connected to the primary node.

At 854 the primary node may send a replicated write to other members of a membership group associated with the sequence number (e.g. secondary nodes). The secondary nodes may verify that the sequence number included with the replicated write matches a sequence number locally stored by the secondary nodes.

At 856, the primary node refrains from sending a write confirmation to the requesting client computing device until confirmation is obtained that the peer members of the membership group (e.g. secondary nodes) locally store matching sequence numbers. Also, in some embodiments, the primary node may refrain from sending the write confirmation to the requesting client computing device until confirmation is obtained that the secondary nodes have successfully written the replicated write.

At 858, it is determined whether the peers (e.g. secondary nodes) locally store matching sequence numbers as the primary node. If the peers do not locally store matching sequence numbers as the sequence number locally stored by the primary node, at 860 the primary node sends a message to the requesting client computing device that the write request has been declined.

At 862, in response to determining that the peer members of the membership group (e.g. secondary nodes) locally store matching sequence numbers as the primary node, the primary node commits the requested write and sends a write confirmation message to the client computing device requesting the write. As mentioned above, in some embodiments, other conditions may need to be satisfied before the write is committed. For example, the primary node may refrain from committing the write until confirmation has been obtained that the secondary nodes have successfully written the replicated write. In some embodiments, a primary node may refrain from committing a write until confirmation from all peer nodes has been received that all of the peer nodes store a same matching sequence number as the primary node.

Figure 9:
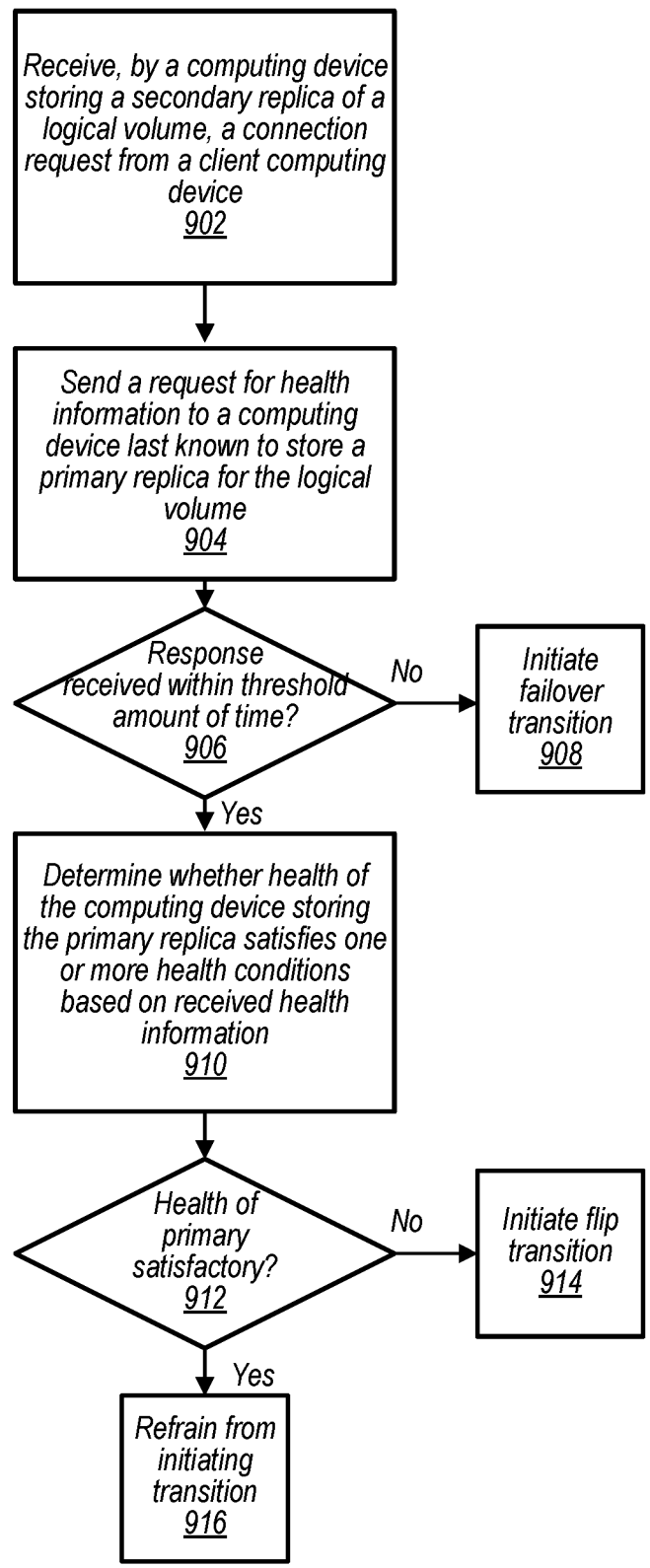
FIG. 9 is a flow diagram illustrating a computing device storing a secondary replica requesting a health check of a primary replica before initiating a transition, according to some embodiments.

FIG. 9 is a flow diagram illustrating a computing device storing a secondary replica requesting a health check of a primary replica before initiating a transition/failover, according to some embodiments.

At 902, a computing device of a block-based storage service storing a secondary replica (e.g. a secondary node) receives a connection request from a client computing device. In some embodiments, the connection request includes a latest sequence number locally stored by the client computing device submitting the connection request.

At 904, the secondary node sends a request for health information of a primary node to a health check API of the primary node. The secondary node determines which node to send the health check request to based on locally stored membership group information locally stored by the secondary node.

At 906, the secondary node determines whether or not a response to the health check request has been received within a threshold amount of time, e.g. a time out period. If a response to the health check is not received within the threshold amount of time, the secondary node proceeds with initiating failover at 908. If a response is received within the threshold amount of time, at 910, the secondary node determines whether the health of the primary node, as indicated in the received health information, satisfies one or more health conditions. If it is determined at 912 that the health of the primary node does not satisfy the health conditions (e.g. the primary node is in bad health), at 914 the secondary nodes proceeds to initiate a transition/failover. However, if it is determined at 912 that the health of the primary node does satisfy the one or more health conditions (e.g. the primary node is in good health), at 916, the secondary node refrains from initiating a transition/failover.

Figure 10:
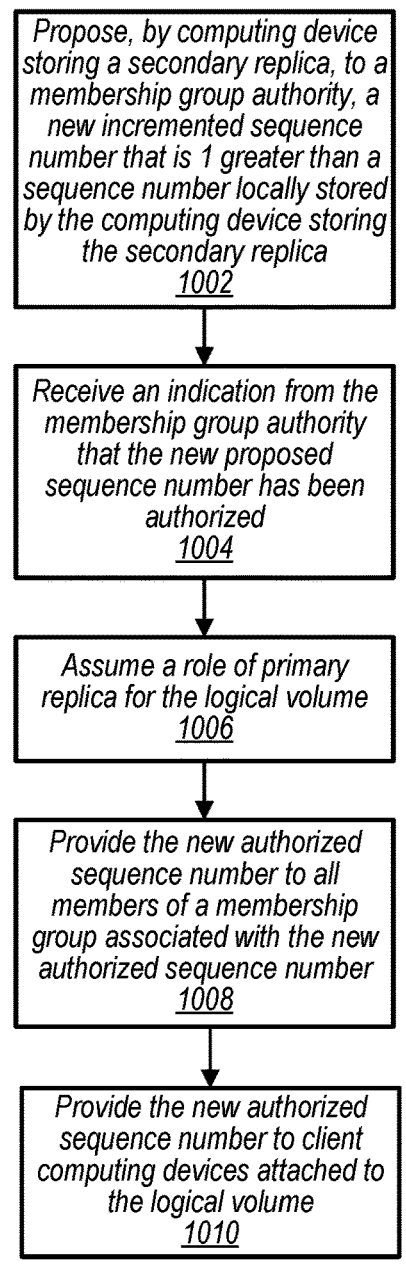
FIG. 10 is a flow diagram illustrating a transition/failover process, according to some embodiments.

FIG. 10 is a flow diagram illustrating a fail over process, according to some embodiments.

To initiate a failover, a secondary node, at 1002, proposes a new sequence number to a membership group authority along with updated membership group information indicating that the secondary node will be assuming a role of primary node for the logical volume. The proposed sequence number is "1" greater than the latest sequence number locally stored by the secondary node for the logical volume. In other words the secondary node increments its locally stored sequence number and proposes the incremented sequence number as a new sequence number to the membership group authority. If the proposed sequence number has not already been authorized, the membership group authority will authorize the proposed sequence number and store in a membership group and sequence number store of the membership group authority the newly authorized sequence number and associated updated membership group information.

At 1004, the secondary node receives an indication from the membership group authority that the proposed sequence number and associated updated membership group information indicating the secondary node is to assume the role of primary node has been authorized.

At 1006, the secondary node assumes the role of primary node for the logical volume. This may mean that the secondary replica already stored by the secondary node is designated as a primary replica for the logical volume. Also, because the block-based storage system may only accept read and writes at a primary node, future read and write requests will be directed to the newly promoted primary node.

At 1008, the newly promoted primary node provides the newly authorized sequence number and associated updated membership group information to other members of the membership group, such as other secondary nodes.

At 1010, the newly promoted primary node may provide the newly authorized sequence number and associated updated membership group information to client computing devices of the logical volume.

Figure 11:
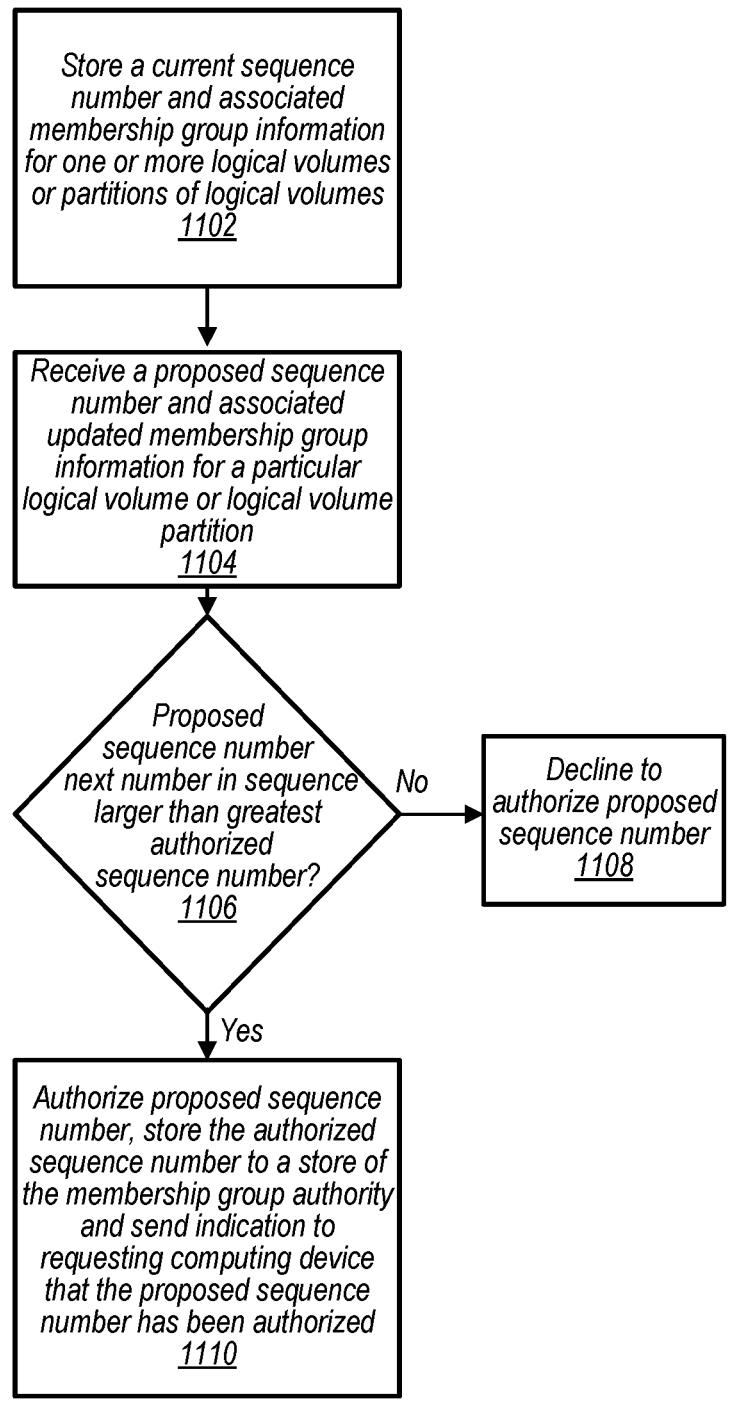
FIG. 11 is a flow diagram illustrating a process followed by a membership group authority, according to some embodiments.

FIG. 11 is a flow diagram illustrating a process followed by a membership group authority, according to some embodiments.

At 1102, a membership group authority stores a current sequence number for a membership group for a logical volume, wherein the membership group defines which of a plurality of computing devices of a block-based storage system store a primary replica of the logical volume and a secondary replica of the logical volume.

At 1104, the membership group authority receives a proposed sequence number and associated updated membership group information for a particular logical volume or logical volume partition.

At 1106, the membership group authority determines whether the proposed sequence number is a next larger sequence number in a sequence (e.g. is it larger than the most recent sequence number by "1") and whether or not the proposed sequence number has already been authorized for the logical volume. If the sequence number is out of order or already authorized, at 1108, the membership group authority declines to authorize the proposed sequence number.

If the proposed sequence number is the next larger sequence number in the sequence and not already authorized, at 1110 the membership group authority authorizes the proposed sequence number.

Figure 12:
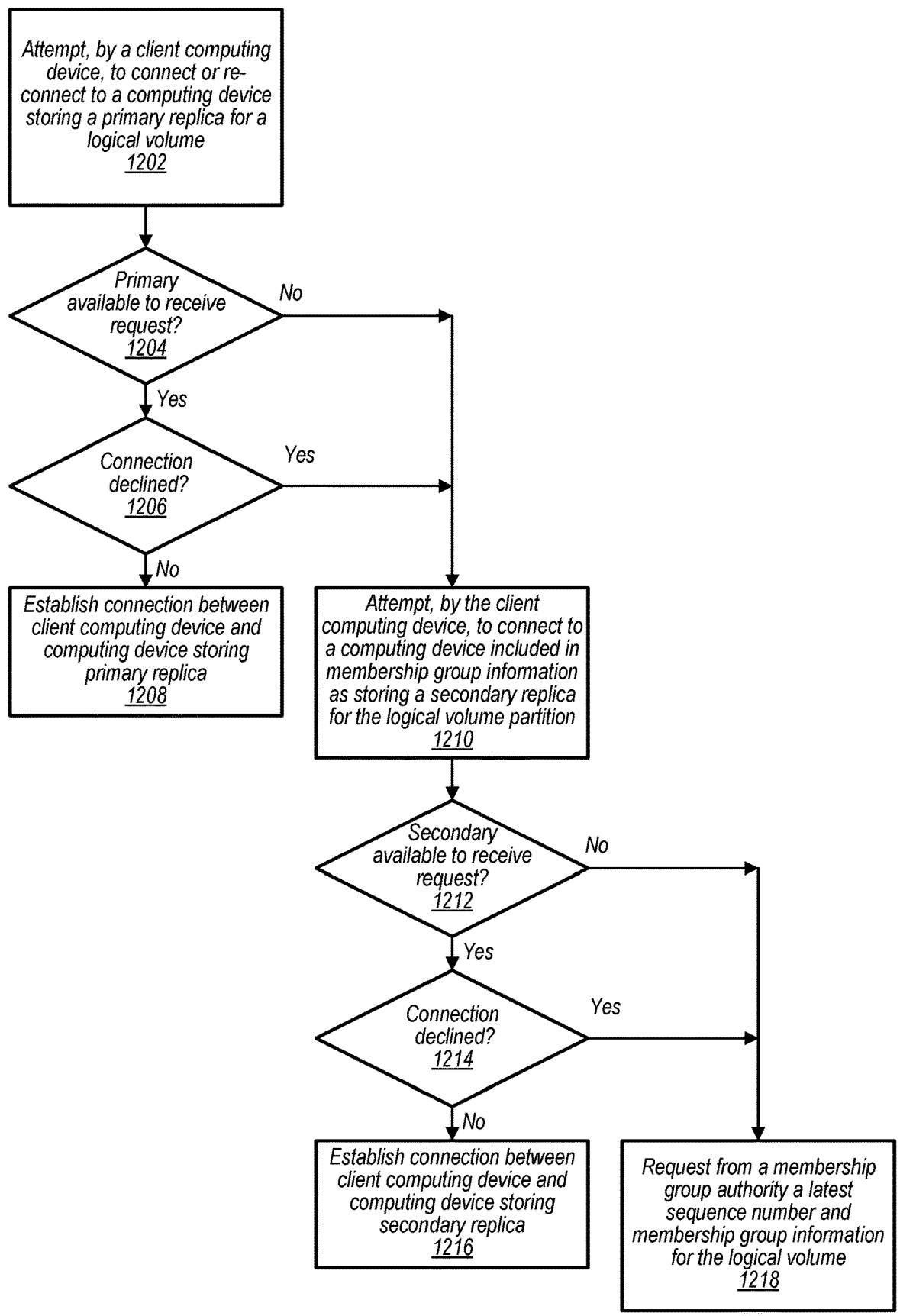
FIG. 12 is a flow diagram illustrating a connection request flow followed by a client computing device, according to some embodiments.

FIG. 12 is a flow diagram illustrating a connection request flow followed by a client computing device, according to some embodiments.

At 1202, a client computing device attempts to connect or re-connect to a computing device of a block-based storage service storing a primary replica for a logical volume (e.g. a primary node). At 1204, the client computing device determines whether the primary node is available to receive the request (e.g. does the request time out?). Also, at 1206, the client computing device determines whether the request was declined. If the request is accepted, at 1208, the client computing device establishes a connection with the primary node.

If the primary node was unavailable at 1204 or declined the request to connect at 1206, the client computing device at 1210 attempts to connect to a computing device of the block-based storage service storing a secondary replica for the logical volume (e.g. a secondary node). In some embodiments, a node declining a connection request may provide a client computing device with updated membership group information and a latest associated sequence number. For example, if a client computing device attempts to connect with a very stale sequence number (e.g. more than 1 sequence number less than a latest sequence number), the node being contacted for connection may provide the client computing device with the latest sequence number and associated membership group information. This may prevent the client computing device from attempting to connect to a secondary node indicated in the client's stale membership group information that has most likely also been superseded.

At 1212, the client computing device determines whether the secondary node is available to receive the request (e.g. does the request time out?). Also, at 1214, the client computing device determines whether the request to the secondary node was declined. If the request is accepted, at 1216, the client computing device establishes a connection with the secondary node, which will cause the secondary node to propose a new sequence number to assume the role of primary node.

If the secondary node is unavailable to receive a connection request or declines a connection request (at 1212 or 1214), in some embodiments, the client computing device may request from a membership group authority a latest sequence number for the logical volume and associated updated membership group information associated with the latest sequence number. The client computing device may then attempt to connect to a primary or a secondary node indicated in the latest updated membership group information received from the membership group authority. In some embodiments, a secondary node may provide updated membership group information and a latest sequence number in response declining a connection request.

Figure 13:
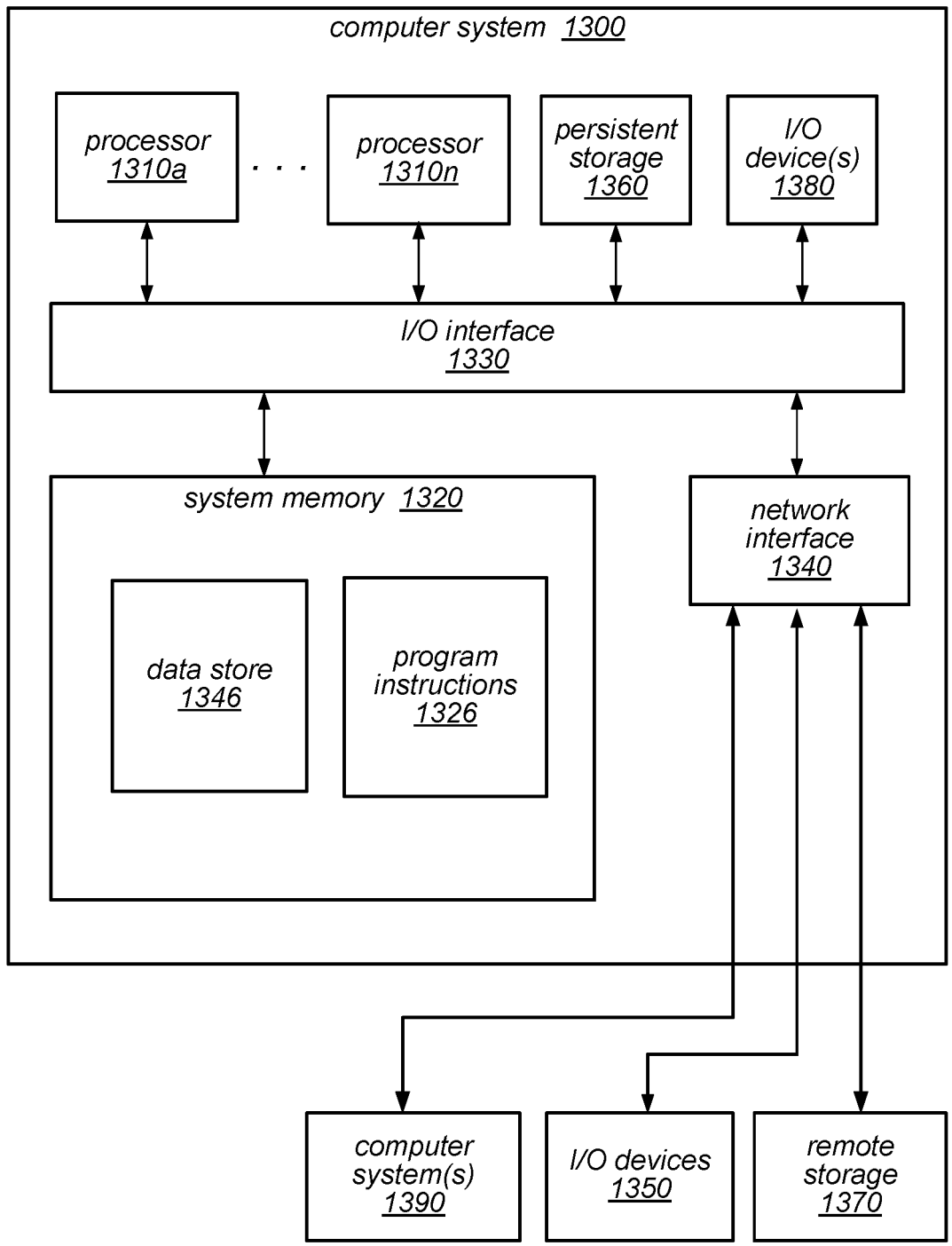
FIG. 13 is a block diagram illustrating an example computer system, according to various embodiments.

FIG. 13 is a block diagram illustrating an example computer system, according to various embodiments. For example, computer system 1300 may be configured to implement storage and/or compute nodes of a compute cluster, a data stores, and/or a client, in different embodiments. Computer system 1300 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1300 includes one or more processors 1310 (any of which may include multiple cores, which may be single or multi-threaded) coupled to a system memory 1320 via an input/output (I/O) interface 1330. Computer system 1300 further includes a network interface 1340 coupled to I/O interface 1330. In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA. The computer system 1300 also includes one or more network communication devices (e.g., network interface 1340) for communicating with other systems and/or components over a communications network (e.g. Internet, LAN, etc.).

In the illustrated embodiment, computer system 1300 also includes one or more persistent storage devices 1360 and/or one or more I/O devices 1380. In various embodiments, persistent storage devices 1360 may correspond to disk drives, tape drives, solid state memory, other mass storage devices, block-based storage devices, or any other persistent storage device. Computer system 1300 (or a distributed application or operating system operating thereon) may store instructions and/or data in persistent storage devices 1360, as desired, and may retrieve the stored instruction and/or data as needed. For example, in some embodiments, computer system 1300 may host a storage system server node, and persistent storage 1360 may include the SSDs attached to that server node.

Computer system 1300 includes one or more system memories 1320 that are configured to store instructions and data accessible by processor(s) 1310. In various embodiments, system memories 1320 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1320 may contain program instructions 1325 that are executable by processor(s) 1310 to implement the methods and techniques described herein. In various embodiments, program instructions 1325 may be encoded in platform native binary, any interpreted language such as Java™ byte-code, or in any other language such as C/C++, Java™, etc., or in any combination thereof. For example, in the illustrated embodiment, program instructions 1325 include program instructions executable to implement the functionality of a resource host, in different embodiments. In some embodiments, program instructions 1325 may implement multiple separate clients, nodes, and/or other components.

In some embodiments, program instructions 1325 may include instructions executable to implement an operating system (not shown), which may be any of various operating systems, such as UNIX, LINUX, Solaris™, MacOS™, Windows™, etc. Any or all of program instructions 1325 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1300 via I/O interface 1330. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1300 as system memory 1320 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1340.

In some embodiments, system memory 1320 may include data store 1345, which may be configured as described herein. In general, system memory 1320 (e.g., data store 1345 within system memory 1320), persistent storage 1360, and/or remote storage 1370 may store data blocks, replicas of data blocks, metadata associated with data blocks and/or their state, configuration information, and/or any other information usable in implementing the methods and techniques described herein.

In one embodiment, I/O interface 1330 may be configured to coordinate I/O traffic between processor 1310, system memory 1320 and any peripheral devices in the system, including through network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments, some or all of the functionality of I/O interface 1330, such as an interface to system memory 1320, may be incorporated directly into processor 1310.

Network interface 1340 may be configured to allow data to be exchanged between computer system 1300 and other devices attached to a network, such as other computer systems 1390, for example. In addition, network interface 1340 may be configured to allow communication between computer system 1300 and various I/O devices 1350 and/or remote storage 1370. Input/output devices 1350 may, in some embodiments, include one or more display terminals, keyboards, keypads, touchpads, scanning devices, voice or optical recognition devices, or any other devices suitable for entering or retrieving data by one or more computer systems 1300. Multiple input/output devices 1350 may be present in computer system 1300 or may be distributed on various nodes of a distributed system that includes computer system 1300. In some embodiments, similar input/output devices may be separate from computer system 1300 and may interact with one or more nodes of a distributed system that includes computer system 1300 through a wired or wireless connection, such as over network interface 1340. Network interface 1340 may commonly support one or more wireless networking protocols (e.g., Wi-Fi/IEEE 802.11, or another wireless networking standard). However, in various embodiments, network interface 1340 may support communication via any suitable wired or wireless general data networks, such as other types of Ethernet networks, for example. Additionally, network interface 1340 may support communication via telecommunications/telephony networks such as analog voice networks or digital fiber communications networks, via storage area networks such as Fibre Channel SANs, or via any other suitable type of network and/or protocol. In various embodiments, computer system 1300 may include more, fewer, or different components than those illustrated in FIG. 13 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    a set of computing devices configured to implement a block storage service, wherein the block storage service is configured to:
        attach multiple virtual machines to a volume of the block-storage service, wherein the volume appears as a locally attached storage device to each of the multiple virtual machines;
        perform a read received from a first one of the virtual machines while the volume remains attached to the multiple virtual machines; and
        perform a read received from a second one of the virtual machines while the volume remains attached to the multiple virtual machines.

2. The system of claim 1, wherein the block storage service is further configured to:
    receive a write request from a third one of the multiple virtual machines attached to the volume and commit a write included in the write request to the volume, wherein the multiple virtual machines remain attached to the volume while receiving and committing the write; and
    receive a second write request from a fourth one of the multiple virtual machines attached to the volume and commit another write included in the second write request to the volume, wherein the multiple virtual machines remain attached to the volume while receiving and committing the other write.

3. The system of claim 1, wherein the read from the first virtual machine or the read from the second virtual machine are formatted using a small computer system interface (SCSI) format.

4. The system of claim 1, further comprising:
    network-accessible computing resources configured to implement a cloud provider network,
    wherein the set of computing devices configured to implement the block storage service are included in the cloud provider network.

5. The system of claim 4, further comprising:
    an additional set of computing devices configured to implement a virtual compute service,
    wherein the additional set of computing devices configured to implement the virtual compute service are included in the cloud provider network, and
    wherein the multiple virtual machines attached to the volume are compute instances provided by the virtual compute service of the cloud provider network.

6. The system of claim 1, wherein the set of computing devices configured to implement the block storage service comprise:
    a first set of computing devices in a first availability zone of the cloud provider network;
    a second set of computing devices in a second availability zone of the cloud provider network; and a third set of computing devices in a third availability zone of the cloud provider network,
wherein the block storage service is configured to store replicas of respective blocks of the volume in each of the three availability zones of the cloud provider network.

7. The system of claim 6, wherein the first, second, and third sets of computing devices comprise solid-state drives that store replicated data for the replicas of the respective blocks of the volume in each of the three availability zones.

8. A method, comprising:
attaching multiple virtual machines to a volume of a block-storage service, wherein the volume appears as a locally attached storage device to each of the multiple virtual machines;
performing a read received from a first one of the multiple virtual machines while the volume remains attached to the multiple virtual machines; and
performing a read received from a second one of the multiple virtual machines while the volume remains attached to the multiple virtual machines.

9. The method of claim 8, wherein the read from the first virtual machine or the read from the second virtual machine are formatted using a small computer system interface (SCSI) format.

10. The method of claim 8, wherein:
the block storage service is implemented in a cloud provider network; and
the multiple virtual machines are compute instances of a virtualized computing service implemented in the cloud provider network.

11. The method of claim 8, further comprising:
committing a write received from a third one of the multiple virtual machines while the volume remains attached to the multiple virtual machines; and
committing a write received from a fourth one of the multiple virtual machines while the volume remains attached to the multiple virtual machines.

12. The method of claim 8, wherein the block storage service is a service provided by a cloud provider network.

13. The method of claim 12, wherein the first and second virtual machines are provided by a virtual computing service of the cloud provider network.

14. The method of claim 8, further comprising:
authorizing a membership group for the volume; and
verifying, for a given one of the reads received from the first or second virtual machine, that a current sequence number for the membership group stored by a computing device of the block-storage service receiving the given read has not been superseded at other computing devices of the membership group prior to performing the given read.

15. The method of claim 14, further comprising:
verifying that a sequence number included with the given read is equal to or greater than a current sequence number for the volume stored by the computing device receiving the read from the first or second virtual machine;
comparing the sequence number included with the read to sequence numbers stored by at least two other computing devices of the block-storage service storing replicas of the volume; and
declining to perform the read in response to the first computing device or one of the at least two other computing devices storing a sequence number for the volume greater than the sequence number included with the given read.

16. The method of claim 8, further comprising:
receiving a write request from the first or the second one of the multiple virtual machines attached to the volume and performing a requested write for the volume while the multiple virtual machines remain attached to the volume; and
receiving a second write request from a different one of the first or the second ones of the multiple virtual machines attached to the volume and performing another requested write for the volume while the multiple virtual machines remain attached to the volume.

17. One or more non-transitory, computer-readable, media storing program instructions, that when executed on or across one or more processors, cause the one or more processors to:
perform a read received from a first one of multiple virtual machines attached to a volume while the volume remains attached to the multiple virtual machines; and
perform a read received from a second one of the multiple virtual machines while the volume remains attached to the multiple virtual machines.

18. The one or more non-transitory, computer-readable, media of claim 17, wherein the program instructions, when executed on or across the one or more processors, cause the one or more processors to:
perform a write received from a third one of the multiple virtual machines attached to the volume while the volume remains attached to the multiple virtual machines; and
perform a write received from a fourth one of the multiple virtual machines while the volume remains attached to the multiple virtual machines.

19. The one or more non-transitory, computer-readable, media of claim 17, wherein the program instructions, when executed on or across the one or more processors, cause the one or more processors to:
attach the multiple virtual machines to the volume, wherein the volume is a volume of a block-storage service, and wherein the volume appears as a locally attached storage device to each of the multiple virtual machines.

20. The one or more non-transitory, computer-readable, media of claim 19, wherein:
the block storage service is implemented in a cloud provider network; and
the first and second virtual machines are compute instances of a virtualized computing service implemented in the cloud provider network.

21. The one or more non-transitory, computer-readable, media of claim 20, wherein the block storage service is implemented using:
a first set of computing devices in a first availability zone of the cloud provider network;
a second set of computing devices in a second availability zone of the cloud provider network; and
a third set of computing devices in a third availability zone of the cloud provider network.

22. The one or more non-transitory, computer-readable, media of claim 17, wherein the program instructions, when executed on or across the one or more processors, cause the one or more processors to:
verify that a sequence number included with a given one of the reads received from the first or second virtual is equal to or greater than a current sequence number for the volume stored by a computing device receiving the given read from the first or second virtual machine;

compare the sequence number included with the given read to sequence numbers stored by at least two other computing devices of the block-storage service storing replicas of the volume; and decline to perform the given read in response to the first computing device or one of the at least two other computing devices storing a sequence number for the volume greater than the sequence number included with the given read.

* * * * *